United States Patent
Imai et al.

(10) Patent No.: US 10,258,113 B2
(45) Date of Patent: Apr. 16, 2019

(54) MOLDED SURFACE FASTENER AND CUSHION BODY

(71) Applicant: YKK Corporation, Tokyo (JP)

(72) Inventors: Shinichi Imai, Toyama (JP); Mineto Terada, Toyama (JP); Kenji Okuda, Toyama (JP); Tsuyoshi Minato, Macon, GA (US); Zhiyu Ren, Macon, GA (US)

(73) Assignee: YKK Corporation (JP)

( * ) Notice: Subject to any disclaimer, the term of this patent is extended or adjusted under 35 U.S.C. 154(b) by 55 days.

(21) Appl. No.: 15/320,633

(22) PCT Filed: Jul. 3, 2014

(86) PCT No.: PCT/JP2014/067819
§ 371 (c)(1),
(2) Date: Dec. 20, 2016

(87) PCT Pub. No.: WO2016/002049
PCT Pub. Date: Jan. 7, 2016

(65) Prior Publication Data
US 2017/0150788 A1    Jun. 1, 2017

(51) Int. Cl.
*A44B 18/00* (2006.01)
*A47C 7/18* (2006.01)
(Continued)

(52) U.S. Cl.
CPC ...... *A44B 18/0049* (2013.01); *A44B 18/0061* (2013.01); *A44B 18/0076* (2013.01);
(Continued)

(58) Field of Classification Search
CPC ... A44B 18/0049; A44B 18/0061; A47C 7/18; B60N 2/5833; B60N 2/7017; B68G 7/05
See application file for complete search history.

(56) References Cited

U.S. PATENT DOCUMENTS 4,842,916 A * 6/1989 Ogawa ............... A44B 18/0073
24/444
5,643,651 A * 7/1997 Murasaki .......... A44B 18/0003
24/442
(Continued)

FOREIGN PATENT DOCUMENTS

JP    2002-078512 A    3/2002
WO    20030030672 A1   4/2003
(Continued)

OTHER PUBLICATIONS

International Search Report, PCT International Patent Application No. PCT/JP2014/067819, dated Sep. 22, 2014.

*Primary Examiner* — Philip F Gabler
(74) *Attorney, Agent, or Firm* — Kilpatrick Townsend & Stockton LLP

(57) ABSTRACT

The molded surface fastener has a plurality of engaging regions having engaging elements and a plurality of space regions disposed between the engaging regions. Each space region has a plurality of wall pieces standing on a substrate portion and intrusion-accepted space portions which allows a foam resin material to intrude across the wall pieces in foam molding of a cushion body. By that, deformation or breakage of the engaging element in a manufacturing process can be prevented. Moreover, the molded surface fastener is firmly fixed in a state that the engaging elements are exposed.

9 Claims, 13 Drawing Sheets

(51) Int. Cl.
   *B60N 2/58*   (2006.01)
   *B60N 2/70*   (2006.01)
   *B68G 7/05*   (2006.01)

(52) U.S. Cl.
   CPC .............. *A47C 7/18* (2013.01); *B60N 2/5833* (2013.01); *B60N 2/7017* (2013.01); *B68G 7/05* (2013.01)

(56) References Cited

U.S. PATENT DOCUMENTS

| | | | | |
|---|---|---|---|---|
| 5,766,723 | A * | 6/1998 | Oborny | A44B 18/0076 24/442 |
| 5,786,061 | A * | 7/1998 | Banfield | A44B 18/0076 24/442 |
| 6,720,059 | B2 * | 4/2004 | Fujisawa | A44B 18/0046 24/442 |
| 2002/0023322 | A1 | 2/2002 | Murasaki | |
| 2002/0164451 | A1 * | 11/2002 | Fujisawa | A44B 18/0046 428/100 |
| 2011/0197404 | A1 * | 8/2011 | Terada | A44B 18/0049 24/442 |
| 2013/0149490 | A1 | 6/2013 | Cina et al. | |
| 2013/0167332 | A1 * | 7/2013 | Terada | A44B 18/0065 24/450 |
| 2015/0164186 | A1 * | 6/2015 | Cina | A44B 18/0076 24/449 |

FOREIGN PATENT DOCUMENTS

| WO | 20100146667 A1 | 12/2010 |
|---|---|---|
| WO | 2013/061423 A1 | 5/2013 |

\* cited by examiner

MOLDED SURFACE FASTENER AND CUSHION BODY

This application is a national stage application of PCT/JP2014/067819, which is incorporated herein by reference.

TECHNICAL FIELD

The invention relates to a molded surface fastener which is integrated to a surface of a cushion body in foam molding of the cushion body, especially the one which can prevent a foam resin material from intruding into an engaging region in foam molding of the cushion body, and a cushion body to which the molded surface fastener is integrated.

BACKGROUND ART

Passenger seats of automobiles or trains, various kinds of sofas, office chairs and the like are often formed by attaching a skin material such as fiber fabric or natural or synthetic leather to a surface of a cushion body (foam body) molded in a predetermined shape by using a foam resin material. The cushion body used in these various seats often has a curved surface composed of convex-concave shapes satisfying human engineering factors in order to maintain a seating posture which provides no fatigue despite long-hour seating.

Moreover, when the skin material is attached to the surface of a cushion body, after molding the cushion body in a desired shape, a method of covering and fixing the skin material to the surface of the obtained cushion body is often employed. In particular, in this case, a molded surface fastener is generally used as means for fixing the surface of the cushion body and a bottom surface of the skin material.

A molded surface fastener has a configuration in which a plurality of engaging elements (for example, male engaging elements) are disposed on one surface (first surface) of a base portion made of a thermoplastic resin, and such a molded surface fastener is integrated so that the engaging elements are exposed to the surface of the cushion body when the cushion body is molded. Moreover, a plurality of female engaging elements (loop-shaped engaging elements) configured to be fastened to the engaging elements of the molded surface fastener are formed on the bottom surface of the skin material that covers the cushion body.

After the skin material covers on the cushion body to which the molded surface fastener is integrated, the female engaging elements disposed on the bottom surface of the skin material are pressed against the male engaging elements of the molded surface fastener disposed on the surface of the cushion body, thereby the skin material is fastened to the molded surface fastener. In this manner, the skin material is easily fixed to the surface of the cushion body along the convex-concave shapes of the surface, and the skin material is prevented from floating from the cushion body.

Examples of the molded surface fastener integrated to the cushion body are disclosed in Japanese patent Publication No. 2002-78512 (Patent Document 1) and International Publication WO2003/030672 Pamphlet (Patent Document 2).

Here, a molded surface fastener described in Patent Document 1 is explained briefly referencing FIG. 20. The molded surface fastener 80 in Patent Document 1 is foamed by injection molding or extrusion molding of thermoplastic resin and configured by providing an engaging region 82 and a space region 83 alternately in a length direction on a thin plate-shaped substrate portion 81.

Each engaging region 82 of the molded surface fastener 80 has a plurality of hook-shaped engaging elements 84 standing on an upper surface of the substrate portion 81 and a continuous fence portion 85 which appears as a square shape or an oblong shape from a planar view and is formed by surrounding a plurality of the engaging elements 84. Left and right side edge attaching portions 86 whose upper surfaces are formed to be flat are disposed on the left and right outer side of the fence portion 85. Further, each space region 83 is provided between front and bottom engaging regions 82, and the upper surface of the space region 83 is formed as a flat surface in which the engaging elements 84 do not exist.

In a case of foam molding of a cushion body so as such a molded surface fastener 80 as in Patent Document 1 to be integrated to, the molded surface fastener 80 is held at an inner surface (cavity surface) of a molding die for molding the cushion body and a foam resin material is injected into an inner space (cavity) of the molding die. In this case, the upper surface (top end surface) of the fence portion 85 provided on the molded surface fastener 80 is closely contacted to the inner surface of the molding die, thereby an engaging element forming region which is in an inner side of the fence portion 85 and in which a plurality of engaging elements 84 are formed can be blocked from the inner space of the molding die.

Accordingly, by foam molding of the cushion body in a state that the fence portion 85 of the molded surface fastener 80 is closely contacted to the inner surface of the molding die, it is prevented that the foam resin material intrudes into the engaging element forming region beyond the fence portion 85, and the cushion body to which the molded surface fastener 80 is integrated in a state that the engaging elements 84 are exposed outside can be manufactured.

Particularly, in the molded surface fastener 80 in Patent Document 1 shown in FIG. 20, a space region 83 without having the engaging elements 84 is disposed between the adjacent engaging regions 82. Owing to this, in foam molding of the cushion body so as the molded surface fastener 80 in Patent Document 1 to be integrated to, the foam resin material easily flows into the space region 83 of the molded surface fastener 80 and foams and solidifies as surrounding the space region 83.

Owing to this, in the cushion body to which the molded surface fastener 80 is integrated, not only all the engaging elements 84 of the molded surface fastener 80 can be exposed outside but also an attachment strength (fixing strength) of the molded surface fastener 80 with respect to the cushion body can be effectively enhanced since the space region 83 is buried into the cushion body.

On the other hand, in Patent Document 2, a molded surface fastener which is characterized in that it has a thin plate-shaped substrate portion, at least one engaging element disposed on the substrate portion and a magnetic material mixed in the substrate portion in the length direction is described.

The molded surface fastener explained as an Embodiment in Patent Document 2 is shown in FIG. 21. The molded surface fastener 90 shown in FIG. 21 is configured by providing an engaging region 92 and a space region 93 alternately in the length direction at a center part of a thin plate-shaped substrate portion 91 in a width direction. Moreover, a magnetic body not shown in the Figures is mixed in a part of the region of the substrate portion 91 in the width direction along the length direction.

Each engaging region 92 of the molded surface fastener 90 has a plurality of hook-shaped engaging elements 94 standing on an upper surface of the substrate portion 91 and a continuous surrounding wall portion 95 which is formed as surrounding a plurality of the engaging elements 94 and appears as a square shape or an oblong shape from a planar view. Further, each space region 93 is disposed between the adjacent engaging regions 92, and the upper surface of each space region 93 is formed as a flat surface in which the engaging elements 94 do not exist.

Moreover, vertical resin intrusion barrier portions 96 are provided on respective left and right side edge parts of the substrate portion 91 along the length direction so as to interpose the engaging region 92 and the space region 93. Particularly in the molded surface fastener 90 shown in FIG. 21, each left and right vertical resin intrusion barrier portion 96 has four lines of vertical wall portions parallel to the length direction, and each vertical wall portion is formed by a plurality of vertical wall pieces standing on the substrate portion 91 at a predetermined interval with each other along the length direction. Further in the vertical wall portions adjacent to each other in the width direction, positions of the vertical wall pieces are moved alternately in the length direction, thereby positions of gaps formed between the vertical wall pieces do not overlap in the width direction.

In a case of manufacturing such a molded surface fastener 90 as in Patent Document 2, a manufacturing apparatus which has a cylinder-shaped die wheel capable of rotating in one direction and an extrusion portion extruding a foam resin material toward a periphery of the die wheel is used. Cavities (space portions) for molding an engaging element 94, a surrounding wall portion 95 and a vertical resin intrusion barrier portion 96 in a predetermined shape are provided on the periphery of the die wheel of the manufacturing apparatus.

Further, a storage portion storing a magnetic resin material containing magnetic powder, an extrusion nozzle extruding the magnetic resin material onto an extrusion surface of an extrusion portion, a flow channel flowing the magnetic resin material stored in the storage portion toward the extrusion nozzle are provided in the manufacturing apparatus. Owing to this, it becomes possible that the magnetic resin material is extruded from the extrusion nozzle at the same time of extruding the molten resin material from the extrusion portion, then the magnetic powder is mixed in a predetermined part of the molten resin material.

Generally, in the manufacturing apparatus of the molded surface fastener 90 as described above, a pickup roller is disposed opposing to a periphery of the die wheel on a downstream side of the extrusion portion for the molten resin material and the extrusion nozzle for the magnetic resin material in a rotation direction of the die wheel. By having the pickup roller, the molded surface fastener 90 formed by solidifying the molten resin material on the periphery of the die wheel can be peeled off and collected. By using such a manufacturing apparatus, the molded surface fastener 90 shown in FIG. 21 can be manufactured continuously.

Then, the cushion body is foam molded by injecting the foam resin material into the molding die in a state that the manufactured molded surface fastener 90 is held on a cavity surface of the molding die for molding the cushion body, thereby the cushion body to which the molded surface fastener 90 is integrated can be obtained.

In this case, in the left and right vertical resin intrusion barrier portions 96 provided on the molded surface fastener 90, though there is a possibility that the foam resin material intrudes, for example from a gap between the vertical wall pieces of the first line of the vertical wall portion disposed at the most outside of the vertical resin intrusion barrier portion 96 in foam molding of the cushion body, it can be prevented that the foam resin material intrudes into the engaging region 92 or the space region 93 of the molded surface fastener 90 beyond all four vertical wall portions forming the vertical resin intrusion barrier portion 96 since the vertical wall pieces among the vertical wall portions adjacent to each other of the vertical resin intrusion barrier portion 96 are disposed to be staggered each other as described above.

That is, in the molded surface fastener 90 shown in FIG. 21, the intrusion of the foam resin material into a forming region of the engaging elements 94 surrounded by the surrounding wall portion 95 is effectively prevented in foam molding of the cushion body by the left and right vertical resin intrusion barrier portions 96 provided on the left and right side edge part of the substrate portion 91 and the surrounding wall portion 95 provided in each engaging region 92.

PRIOR ART DOCUMENTS

Patent Documents

Patent Document 1: Japanese Patent Publication No. 2002-78512
Patent Document 2: International Publication No. WO2003/030672 Pamphlet

SUMMARY OF INVENTION

Problem to be Solved by the Invention

Since the molded surface fastener 80 described in Patent Document 1 consists of, as described above, the engaging region 82 and the space region 83 being provided alternately in the length direction as described above, an attachment strength (fixing strength) of the molded surface fastener 80 with respect to the cushion body can be enhanced by integrating the molded surface fastener 80 to the cushion body in a state of burying the space region 83 in foam molding of the cushion body.

In the meantime, for example in a case that the molded surface fastener 80 in Patent Document 1 shown in FIG. 20 is manufactured by using a manufacturing apparatus having a die wheel in which the concaved molding cavity of the engaging element is disposed on the periphery, the molded surface fastener 80 which is cooled and solidified on the periphery of the die wheel is normally peeled off from the die wheel by a pickup roller and the like and collected.

In this case, since the engaging elements 84 are not provided in the space region 83 of the molded surface fastener 80, when the molded surface fastener 80 is peeled off from the die wheel, the space region 83 is easily peeled off almost without receiving peeling resistance which is generated when a molded part is pulled out from the cavity formed on the periphery of the die wheel.

On the other hand, since the above-mentioned peeling resistance becomes large in the engaging region 82 of the molded surface fastener 80, the peeling resistance of the molded surface fastener 80 becomes uneven in the length direction of the molded surface fastener 80. By this, there was a possibility that a shape of the peeled product deforms partially. Particularly, when the molded surface fastener 80 is peeled off continuously from the periphery of the die wheel along the length direction, though the space region 83 of the molded surface fastener 80 is easily separated from the die wheel with a weak force, a strong force is easy to be added locally with respect to the engaging element 84 or the fence portion 85 which are disposed near the space region 83 in the engaging region 82, and there was a concern that the shape of the engaging element 84 or the fence portion 85 would be affected by deforming.

Further, the molded surface fastener 80 is peeled off from the periphery of the die wheel, carried to a cutting portion and cut in a desired length. In this case, for example while the molded surface fastener 80 is held by a pair of feed rollers disposed on upper and lower parts of the molded surface fastener 80, the feed rollers rotate, thereby the molded surface fastener 80 is carried toward the cutting part at the downstream side.

However, in this case, if the engaging region 82 and the space region 83 are provided alternately in the length direction and the space region is formed only of the flat substrate portion 81 without the engaging element 84 as the molded surface fastener 80 in Patent Document 1, a thickness dimension of the space region 83 becomes smaller than the one of the engaging region 82 in which the engaging element 84 or the fence portion 85 are provided.

Accordingly, when the molded surface fastener 80 is carried by the pair of upper and lower feed rollers, though the molded surface fastener 80 can be carried toward the downstream side smoothly at the part of the engaging region 82 of the molded surface fastener 80 by being held by the feed rollers from upper and lower sides, the feed rollers may rotate without holding the molded surface fastener 80 at the part of the space region 83 of the molded surface fastener 80 since the thickness dimension is small, and the conveyance of the molded surface fastener 80 may be unstable.

On the other hand, in the molded surface fastener 90 in Patent Document 2 shown in FIG. 21, an engaging region 92 and a space region 93 are provided alternately in a length direction at a center part of a substrate portion 91 in a width direction, and vertical resin intrusion barrier portions 96 having a predetermined height dimension are provided continuously over the whole length direction at left and right side edge parts of the substrate portion 91.

Owing to this, in a case of manufacturing the molded surface fastener 90 by using a manufacturing apparatus with a die wheel, when the molded surface fastener 90 is peeled off from the die wheel by pickup rollers and the like, peeling resistance can be obtained by vertical resin intrusion barrier portions 96 also in the space region 93 of the molded surface fastener 90. Accordingly, in the molded surface fastener 90 in Patent Document 2, for example as in Patent Document 1 as described above, defects such as deformation of the molded surface fastener 90 can be suppressed.

Further, when the molded surface fastener 90 in Patent Document 2 is peeled off from the periphery of the die wheel and carried toward the downstream side by a pair of upper and lower feed rollers, since the feed rollers hold the vertical resin intrusion barrier portions 96 of the molded surface fastener 90 continuously and carry it toward the downstream side smoothly, the conveyance of the molded surface fastener 90 can be stabilized.

However, in the molded surface fastener 90 in Patent Document 2 shown in FIG. 21, since the vertical resin intrusion barrier portions 96 are provided over the whole length direction at the left and right side edge parts of the substrate portion 91, in a case that the molded surface fastener 90 is integrated to the cushion body in foam molding of the cushion body, the foam resin material is blocked by the left and right vertical resin intrusion barrier portions 96 and prevented from intruding into the space region 93 provided at a center part of the substrate portion 91 in the width direction.

As a result, in the molded surface fastener 90 in Patent Document 2, since each space region 93 cannot be buried within the cushion body for example as in Patent Document 1, there was a case that an attachment strength (fixing strength) with respect to the cushion body becomes smaller than the one of the molded surface fastener 80 in Patent Document 1.

Moreover, in the molded surface fastener 90 in Patent Document 2, in foam molding of the cushion body, though the intrusion of the foam resin material is prevented by the left and right vertical resin intrusion barrier portions 96 as described above, if the foam resin material is sprayed strongly toward the vertical resin intrusion barrier portions 96 of the molded surface fastener 90, the vertical resin intrusion barrier portions 96 cannot weaken the force of the foam resin material and tends to receive a large fluid pressure of the foam resin material when the foam resin material is injected by spraying into the molding die by using, for example, an injection nozzle and the like. As a result, there was a possibility that a position of the molded surface fastener 90 is misaligned or the molded surface fastener 90 floats from a cavity surface of the molding die and the foam resin material intrudes into a forming region of the engaging elements 94.

The present invention was made in the light of the above conventional problems. The specific objective is to provide a molded surface fastener which can enhance an attachment strength with respect to a cushion body by burying at least a part of a substrate portion totally inside the cushion body, prevent the molded surface fastener from deforming or damaging when the molded surface fastener is peeled off from a die wheel in manufacturing the molded surface fastener and be carried by a pair of upper and lower feed rollers smoothly, and also to provide the cushion body to which such a molded surface fastener is integrated.

Means for Solving the Problem

To achieve the above object, a molded surface fastener provided by the present invention is, as a basic configuration, to be integrated to a surface of a cushion body in foam molding of the cushion body wherein the molded surface fastener is made of synthetic resin and has a plurality of engaging regions in which a plurality of hook-shaped engaging elements stand on a plate-shaped substrate portion and a plurality of space regions which are disposed between the engaging regions, the engaging regions having a pair of left and right vertical resin intrusion barrier portions standing at left and right side edge parts of the substrate portion along a length direction and main lateral wall portions standing at a front end edge part and a rear end edge part of the engaging region along a width direction and computing from the space region, being characterized in that the space region has a plurality of wall pieces standing on the substrate portion and intrusion-accepted space portions which allow a foam resin material of the cushion body to intrude across the wall pieces in foam molding of the cushion body and flow in the space region in the width direction.

In such a molded surface fastener of the present invention, it is preferable that a plurality of the wall pieces are provided by standing separately in the space region as a resistance adding portion adding resistance which is generated when the space region of the molded surface fastener is peeled off from a molding die after molding the molded surface fastener.

It is preferable that the intrusion-accepted space portion is formed of a space portion provided between the wall pieces and/or a space portion provided between the wall piece and the vertical resin intrusion barrier portion or the main lateral wall portion.

It is preferable that a height dimension from the substrate portion at the wall piece is set to be the same size as the one from the substrate portion at the vertical resin intrusion barrier portion.

Moreover, it is preferable that the wall pieces are disposed in a row along an extended line of the left and right vertical resin intrusion barrier portions in the space region.

In the molded surface fastener of the present invention, a plurality of the wall pieces may form left and right continuous vertical wall portions along the extended line of the left and right vertical resin intrusion barrier portions in the space region as well as be disposed continuously to the vertical resin intrusion barrier portions, the height dimension from the substrate portion at the left and right vertical wall portions may be set to be smaller than the one from the substrate portion at the vertical resin intrusion barrier portions, and the intrusion-accepted space portion may be provided at an upper side of the vertical wall portion and formed of the space portion within a range from a top end position of the vertical wall portion to a top end position of the vertical resin intrusion barrier portion.

In the molded surface fastener of the present invention, it is preferable that the engaging region has subsidiary lateral wall portions adjacent to an inside of the main lateral wall portions disposed along a width direction.

Moreover, it is preferable that the engaging region has at least one auxiliary lateral wall portion disposed between the front and rear main lateral wall portions disposed at a front end edge part and a rear end edge part in the engaging region along the width direction.

Then, by the present invention, a cushion body in which a molded surface fastener having the above structure is integrated to its surface, being characterized in that a bottom surface of the molded surface fastener, outer side surfaces of the left and right vertical resin intrusion barrier portions and a surface of the space region are fixed to the cushion body, and a cushion part to which the outer side surfaces of the left and right vertical resin intrusion barrier portions are fixed and a cushion part to which the surface of the space region is fixed in the cushion body are formed continuously via the cushion part passing through the intrusion-accepted space portion, is provided.

Effects of the Invention

The molded surface fastener of the present invention has a plurality of engaging regions having a plurality of engaging elements and a plurality of space regions without engaging elements disposed between engaging regions, each engaging region having a pair of left and right vertical resin intrusion barrier portions standing along a length direction and a main lateral portion standing along a width direction so as to be comparted from the space region. The space region has a plurality of wall pieces standing on a substrate portion and intrusion-accepted space portions in which a foam resin material of the cushion body intrudes across the wall pieces in foam molding of the cushion body and which allow the foam resin material to flow in the space region in the width direction.

In such a molded surface fastener as the present invention, for example in a case that the molded surface fastener is peeled off from the periphery of the die wheel and carried toward a downstream side by a pair of upper and lower feed rollers after molding the molded surface fastener by using a manufacturing apparatus with a die wheel, a plurality of wall pieces stand from a substrate portion in the space region of the molded surface fastener. Therefore, the molded surface fastener (particularly the space region of the molded surface fastener) can be stably held from the upper and lower sides by the feed rollers and carried toward the downstream side smoother than for example in a case of the molded surface fastener in Patent Document 1 in which a space region is formed of only flat substrate portion.

Further, in the molded surface fastener of the present invention, since the space region has the intrusion-accepted space portion which allows the intrusion of the foam resin material, in foam molding of the cushion body so as the molded surface fastener to be integrated to, the foam resin material flows easily into the space region of the molded surface fastener from the width direction and is foam solidified as surrounding the space region. Owing to this, in the cushion body to which the molded surface fastener is integrated, since the substrate portion and a plurality of wall pieces in the space region of the molded surface fastener are buried into the cushion body, the attachment strength of the molded surface fastener with respect to the cushion body can be effectively enhanced.

Further, by the space region having the intrusion-accepted space portion, in foam molding of the cushion body, even if the foam resin material is sprayed strongly to the molded surface fastener from the injection nozzle for example, the foam resin material can be flowed into the space region toward the width direction via the intrusion-accepted space portion and thereby the molded surface fastener can easily weaken the force of the foam resin material. Owing to this, it can be effectively prevented that the position of the molded surface fastener is misaligned or the molded surface fastener floats from the cavity surface of the molding die, and allows the foam resin material to intrude into the engaging element forming region, thereby and the molded surface fastener can be stably integrated at a predetermined position of the cushion body in a state that a plurality of engaging elements are exposed.

It should be noted that in the present invention, it is preferable that a total area of the intrusion-accepted space portions per space region from a side view is within a range of 0.15 mm$^2$ to 20 mm$^2$. If the total area of the intrusion-accepted space portions is less than 0.15 mm$^2$, there is a possibility that the foam resin material less easily passes or intrudes. On the other hand, if the total area of the intrusion-accepted space portions is more than 20 mm$^2$, an interval in a longitudinal direction becomes too wide or the height of the gap becomes too high, and the conveyance of the molded surface fastener by the feed rollers may be unstable. It should be noted that an optimal area of the intrusion-accepted space portion from the side view changes corresponding to the number of the intrusion-accepted space portions (division number) and viscosity of the foam liquid and can be changed appropriately corresponding to elements.

Particularly in the molded surface fastener of the present invention, a plurality of wall pieces stand in the space region separately as a resistance adding portion adding resistance which is generated when the space region of the molded surface fastener is peeled off from the molding die after molding the molded surface fastener. Owing to this, for example in a case that the molded surface fastener is manufactured by using a manufacturing apparatus having a die wheel in which concaved molding cavities of the engaging element and the like are disposed on the periphery, when the molded surface fastener which is solidified on the periphery of the die wheel is peeled off from the die wheel by pickup rollers and the like, the peeling resistance which is generated when a space region part is peeled off from the molding die such as the die wheel can be added at the resistance adding portion formed of a plurality of wall pieces provided in the space region. Owing to this, since it can be suppressed that a force which peels the molded surface fastener becomes uneven in the length direction of the molded surface fastener, the engaging element or the main lateral wall portion which are disposed near the space region can be hardly receive a strong force and the molded surface fastener having a predetermined shape can be stably formed.

In such a molded surface fastener as the present invention, the intrusion-accepted space portion is formed of a space portion provided between the wall pieces and/or a space portion provided between the wall piece and the vertical resin intrusion barrier portion or the main lateral wall portion.

The intrusion-accepted space portion is formed as above, thereby since the foam resin material can be flowed into the space region in the width direction and the molded surface fastener can easily weaken the force of the foam resin material in the foam molding of the cushion body so as the molded surface fastener to be integrated to, it can be effectively prevented that the position of the molded surface fastener is misaligned or the molded surface fastener floats from the cavity surface of the molding die. Further, since the foam resin material is foam solidified surrounding the space region easily, the attachment strength of the molded surface fastener with respect to the cushion body can be effectively enhanced.

In this case, the height dimension from the substrate portion at each wall piece is set to be the same size as the one from the substrate portion at the vertical resin intrusion barrier portion, thereby when the molded surface fastener of the present invention is carried toward the downstream side by a pair of upper and lower feed rollers, the feed roller can hold the space region of the molded surface fastener from the upper and lower sides more stably, and the conveyance of the molded surface fastener can be more stabilized.

Moreover, in the molded surface fastener of the present invention, the wall pieces are disposed in line along the extended line of the left and vertical resin intrusion barrier portions in the space region. Owing to this, since the peeling resistance of the molded surface fastener can be added continuously by the vertical resin intrusion barrier portions and a plurality of the wall pieces when the space region of the molded surface fastener is peeled off from the molding die of the die wheel and the like after molding the molded surface fastener, it can be prevented that the peeling force with respect to the molded surface fastener changes considerably in the length direction of the molded surface fastener, and the molded surface fastener (particularly the engaging elements) can be stably peeled off from the molding die of the die wheel and the like without deformation.

Further, the wall pieces are disposed in line along the extended line of the vertical resin intrusion barrier portion, thereby when the molded surface fastener of the present invention is carried toward the downstream side by a pair of upper and lower feed rollers, the upper and lower feed rollers can hold the molded surface fastener stably over the whole length direction, and the molded surface fastener can be more smoothly conveyed.

Moreover, in the molded surface fastener of the present invention, a plurality of wall pieces may form left and right continuous vertical wall portions along the extended line of the left and right vertical resin intrusion barrier portions in the space region as well as be disposed continuously to the vertical resin intrusion barrier portion. In this case, the height dimension from the substrate portion at the left and right continuous vertical wall portions is set to be smaller than the one from the substrate portion at the vertical resin intrusion barrier portion, and the intrusion-accepted space portion is provided at an upper side of the continuous vertical wall portion as well as formed of the space portion within the range from the top end position of the continuous vertical wall portion to the top end position of the vertical resin intrusion barrier portion.

The continuous vertical wall portions are formed as the resistance adding portion by a plurality of wall pieces being disposed in such a manner, thereby the peeling resistance of the space region which is generated when the space region of the molded surface fastener is peeled off from the molding die of the die wheel and the like after molding the molded surface fastener can be effectively increased. Further, the continuous vertical wall portions have the intrusion-accepted space portion as above, thereby since the foam resin material can be flowed into the space region in the width direction and the molded surface fastener can easily weaken the force of the foam resin material in foam molding of the cushion body so as the molded surface fastener to be integrated to, it can be effectively prevented that the position of the molded surface fastener is misaligned or the molded surface fastener floats from the cavity surface of the molding die. Further, since the foam resin material is foam solidified surrounding the space region easily, the attachment strength of the molded surface fastener with respect to the cushion body can be effectively enhanced.

Moreover, in the molded surface fastener of the present invention, the engaging region has subsidiary lateral wall portions disposed adjacent to the inside of the main lateral wall portion along the width direction. Owing to this, since the intrusion of the foam resin material into the engaging region of the molded surface fastener from the length direction can be effectively prevented by the main lateral wall portion and the subsidiary lateral wall portions in foam molding of the cushion body, it can be prevented that the engaging region of the molded surface fastener integrated to the cushion body is buried within the cushion body, and a desired engagement force by the engaging elements can be stably secured.

Further, in the molded surface fastener of the present invention, the engaging region has at least one auxiliary lateral wall portion disposed between the front and rear main lateral wall portions disposed at the front end edge part and the rear end edge part of the engaging region along the width direction. Owing to this, for example in a case that the substrate portion of the molded surface fastener is cut at the engaging region part, not at the space region, so as to obtain the molded surface fastener with a desired length, the above auxiliary lateral wall portion can be used as the vertical resin intrusion barrier portion preventing the foam resin material from intruding from the length direction. Therefore, in the cushion body to which the molded surface fastener is integrated, it can be prevented that the whole of the cut engaging region is buried into the cushion body and the engagement force by the engaging element can be obtained by the vicinity of a cut end part of the engaging region.

According to the present invention, a cushion body in which the molded surface fastener having the above structure is integrated to its surface, wherein a rear surface of the molded surface fastener, outer side surfaces of the left and right vertical resin intrusion barrier portions and a surface of the space region are fixed to the cushion body, and a cushion part to which the outer side surfaces of the left and right vertical resin intrusion barrier portions are fixed and a cushion part to which the surface of the space region is fixed in the cushion body are formed continuously via a cushion part which passes through the intrusion-accepted space portion, is provided.

In such a cushion body as in the present invention, since deformation or breakage of the molded surface fastener caused by a change of the peeling resistance does not occur when the molded surface fastener is peeled off from the die wheel after molding the molded surface fastener, the molded surface fastener (particularly the engaging element) can have a predetermined shape stably. Further, the substrate portion and a plurality of wall pieces in the space region of the molded surface fastener are buried into the cushion body, and the bottom surface of the molded surface fastener, the outer side surfaces of the left and right vertical resin intrusion barrier portions and the surface of the space region are fixed to the cushion body. Moreover, left and right outer side cushion parts to which the outer side surfaces of the left and right vertical resin intrusion barrier portions are fixed and an inner side cushion part to which the surface of the space region is fixed in the cushion body are formed integrally by a cushion part which intrudes into the intrusion-accepted space portion and solidify as a continuous cushion part. Therefore, the cushion body is not in a separated state by the molded surface fastener or the space part and the like. Thus, the molded surface fastener is firmly integrated to the surface of the cushion body.

DESCRIPTION OF EMBODIMENT

Hereinafter, preferred embodiments of the present invention are described in detail with Embodiments referring to drawings. It should be noted that the present invention is not limited thereto, and various changes can be made as long as they have a substantially same structure and same functional effects. For example, in the Embodiments below, a number, a disposed position and an attaching pitch of hook-shaped engaging element disposed on a surface fastener portion is not limited in particular, and can be changed arbitrarily.

Embodiment 1

Figure 1:
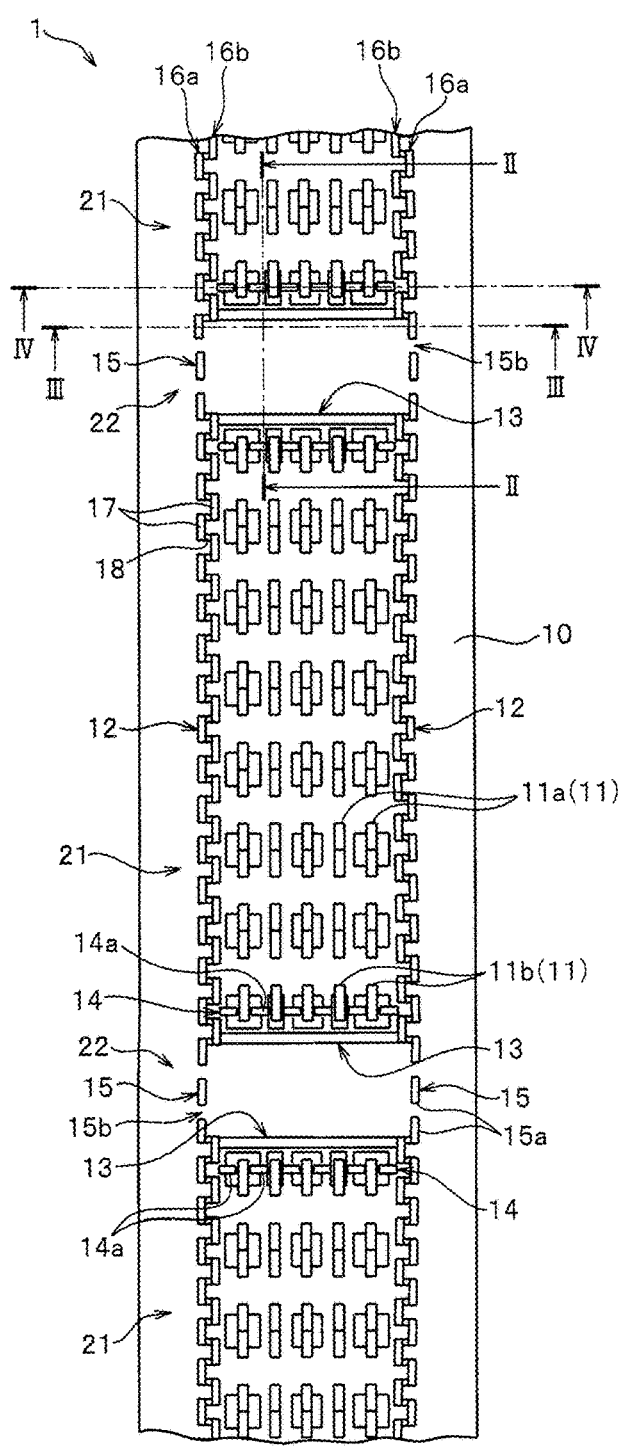
FIG. 1 is a plan view illustrating a molded surface fastener according to Embodiment 1 of the present invention.
Figure 2:
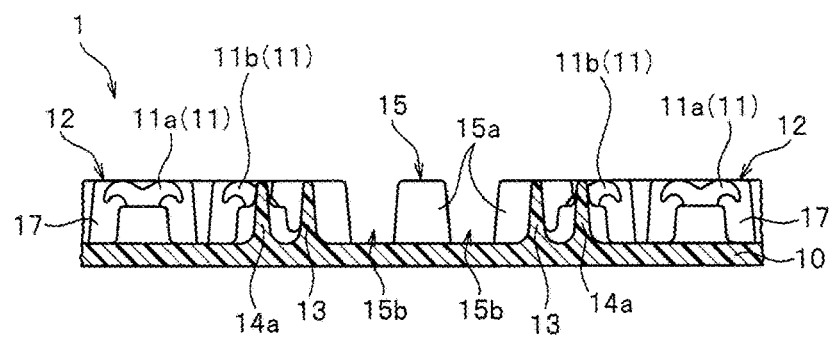
FIG. 2 is a cross-sectional view in II-II line shown in FIG. 1.
Figure 3:
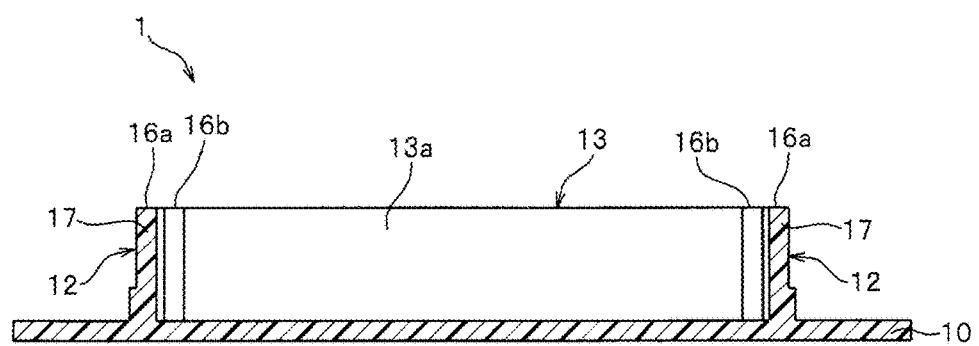
FIG. 3 is a cross-sectional view in III-III line shown in FIG. 1.
Figure 4:
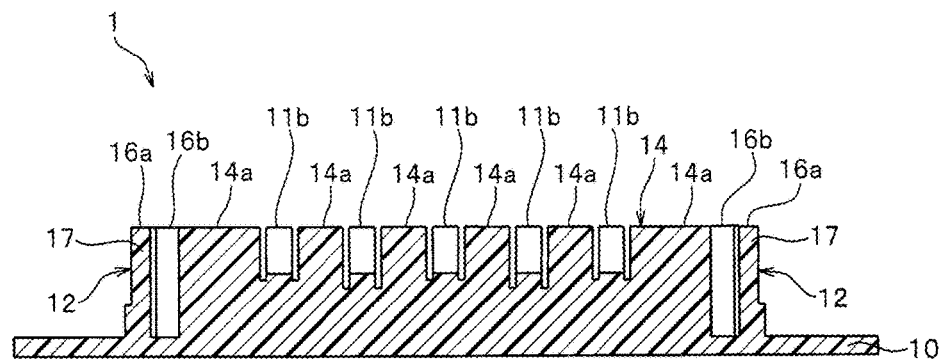
FIG. 4 is a cross-sectional view in IV-IV line shown in FIG. 1.

FIG. 1 shows a plan view of a molded surface fastener according to Embodiment 1 of the present invention. FIG. 2, FIG. 3 and FIG. 4 are a cross-sectional view in II-II line, line and IV-IV line shown in FIG. 1 respectively.

It should be noted that a longitudinal direction in a substrate portion of the molded surface fastener is prescribed as a front and rear direction, and a width direction in the substrate portion is prescribed as a left and right direction. Further, a top and bottom direction in the substrate portion is prescribed as an upper and lower direction, particularly an upper direction means a direction on a side at which engaging elements are disposed with respect to the substrate portion, and a direction of an opposite side thereof means a lower direction.

A molded surface fastener in Embodiment 1 is manufactured by molding a thermoplastic resin material using a manufacturing apparatus (molding apparatus) 30 having a die wheel 31 described later (See FIG. 5), being formed to be a long shape in a length direction and after that, the long molded surface fastener 1 being cut in a predetermined length.

It should be noted that a material of the molded surface fastener 1 is not limited in particular, but single thermoplastic resin material such as, for example, polyethylene, polypropylene, polyester, nylon, polybutylene terephthalate or copolymer of these materials can be used as a material of the molded surface fastener 1. Magnetic particles composed of an alloy of iron, cobalt, nickel and the like are mixed in a part of the thermoplastic resin constituting the molded surface fastener 1 as described later.

The molded surface fastener 1 according to Embodiment 1 has a thin plate-shaped substrate portion 10, and an engaging region 21 in which a plurality of hook-shaped engaging elements 11 stand on an upper surface (first surface) and a space region 22 in which the engaging elements 11 do not exist are disposed alternately in a length direction on the substrate portion 10. Each engaging region 21 is formed at a predetermined interval in the length direction. It should be noted that, in the embodiment, an upper surface of the substrate portion 10 in the space region 22 is a flat surface.

In Embodiment 1, the hook-shaped engaging element 11 has a hook-shaped first engaging element 11a in which an engaging head portion branches as two-pronged and provide a main engagement force of the engaging region 21 as described later and a hook-shaped second engaging element 11b composing a subsidiary lateral wall portion 14 together with a divided lateral wall body 14a described later.

It should be noted that, in Embodiment 1, the engaging region 21 means a region in which the first and second engaging elements 11a, 11b which provide the engagement force when integrated to a surface of the cushion body are disposed, particularly in a case of Embodiment 1, a region between front and rear main lateral wall portions 13 described later disposed to interpose the first and second engaging element 11a, 11b on the substrate portion 10. The engaging region 21 has an engaging element forming region which is surrounded by a pair of left and right vertical resin intrusion barrier portions 12 disposed on both sides of the width direction as described later and the front and rear main lateral wall portions 13 and in which a plurality of first and second engaging elements 11a, 11b stand. Further, the space region 22 means a region which is comparted by the main lateral wall portion 13 from the engaging region 21 and formed in a state that there is no element functioning as the engaging element 11 when integrated to the surface of the cushion body.

A length dimension (a dimension in the length direction) of the space region 22 is not limited in particular, but in a case of Embodiment 1, the length dimension of the space region 22 is set to be smaller than the one of the engaging region 21 so as to obtain the engagement force properly by the first and second engaging elements 11a, 11b within the engaging region 21 in the whole molded surface fastener 1.

In Embodiment 1, each engaging region 21 of the molded surface fastener 1 has a pair of left and right vertical resin intrusion barrier portions 12 standing at the left and right side edge parts of the substrate portion 10 along the length direction so as to interpose a plurality of engaging elements 11, front and rear main lateral wall portions 13 standing at a front end edge part and a rear end edge part of each engaging region 21 along the width direction and computing the engaging region 21 and the space region 22, and a subsidiary lateral wall portion 14 disposed at an inner side of the front and rear main lateral wall portion 13 in the engaging region 21.

On the other hand, a pair of left and right resistance adding wall portions 15 stand at the left and right side edge parts of the substrate portion 10 along the length direction on the substrate portion 10 in each space region 22 of the molded surface fastener 1, and an upper surface of a part which is between the left and right resistance adding wall portions 15 on the substrate portion 10 is formed as a flat surface in which neither the first engaging element 11a nor the second engaging element 11b exists. In this case, the left and right resistance adding wall portions 15 are provided continuously from the vertical resin intrusion barrier portions 12 along the extended line of the left and right vertical resin intrusion barrier portions 12.

It should be noted that, in the present invention, it is better if there is no element engaging a loop material attached to a skin material in the space region 22 of the substrate portion 10 when integrated to the surface of the cushion body. In the Embodiment, the space region 22 is formed as a non-engaging region excluding the first and second engaging elements 11a, 11b. It should be noted that a convex rib portion and the like explained later in Embodiment 4 may be provided so as to be protruded arbitrarily on the upper surface of a part between the left and right resistance adding wall portions 15 of the space region 22.

Following is a specific explanation of a structure of each portion in the molded surface fastener 1 in Embodiment 1.

The substrate portion 10 of the molded surface fastener 1 has a thin plate shape which is long in the front and rear direction (in the length direction) viewing from the upper and lower direction (top and bottom direction), appears as a rectangular narrow shape in the left and right direction (width direction) and is configured to be bendable in the upper and lower direction. The vertical resin intrusion barrier portions 12 are disposed at the left and right side edge sides of each engaging region 21 on the substrate portion 10 in a position inside of the left and right side edges of the substrate portion 10.

Further, the resistance adding wall portions 15 are disposed at a position inside of the left and right side edges of the substrate portion 10 at the left and right side edge sides of each space region 22 on the substrate portion 10. Moreover, the upper surface of the substrate portion 10 which is outside of the vertical resin intrusion barrier portion 12 and the resistance adding wall portion 15 is formed as a flat surface.

The lower surface (bottom surface) of the substrate portion 10 is formed as a flat surface. It should be noted that, in Embodiment 1, a plurality of concave groove portions 60a, 70a parallel to the front and rear direction or a protruded rib portion or an arrow-headed protruded portion can be provided on, or a nonwoven fabric can be fixed to the lower surface of the substrate portion 10 as the molded surface fasteners 3, 4 in Embodiments 3 or 4 as described later. Such a concave groove portion and the like as above on the lower surface of the substrate portion 10 is provided, thereby when the molded surface fastener having the substrate portion is integrated to the cushion body by foam molding of the cushion body (foam body) as described later, a contact area between the molded surface fastener and the cushion body is made to be large and the fixing strength of the molded surface fastener with respect to the cushion body can be enhanced.

A plurality of first engaging elements 11a and a plurality of second engaging elements 11b stand in each engaging region 21 provided on the substrate portion 10 in Embodiment 1 within the inside region surrounded by the left and right vertical resin intrusion barrier portions 12 and the front and rear main lateral wall portions 13. In the present invention, the region surrounded by the left and right vertical resin intrusion barrier portions 12 and the front and rear main lateral wall portions 13 is named as an engaging element forming region or a forming region of the engaging elements 11.

The first engaging elements 11a stand in rows with a predetermined attaching pitch in the length and width directions on the upper surface of the substrate portion 10 so as to obtain a proper engagement force with respect to female engaging elements (loop-shaped engaging elements) of a skin material covering the cushion body. Particularly, the first engaging elements 11a in each engaging region 21 in Embodiment 1 are in five lines between the left and right vertical resin intrusion barrier portions 12 along the length direction (vertical direction) and in six lines between the front and rear main lateral wall portions 13 along the width direction (lateral direction).

Each first engaging element 11a has a rising portion standing from the upper surface of the substrate portion 10 vertically and a hook-shaped engaging head portion branching from an upper end part of the rising portion in the front and rear direction and bending. The height dimension from the upper surface of the substrate portion 10 in each first engaging element 11a (the dimension in the height direction) is set to be the same size as the one of a vertical wall body 17 of the vertical resin intrusion barrier portion 12 described later, the main lateral wall portion 13 (continuous lateral wall body 13a described later) and a divided lateral wall body 14a of the subsidiary lateral wall portion 14 described later.

In Embodiment 1, a reinforcement portion reinforcing the first engaging element 11a is provided integrally to the left and right sides of the rising portion at each first engaging element 11a disposed in the first, third and fifth vertical lines from the left vertical resin intrusion barrier portion 12.

Each second engaging element 11b has a rising portion standing from the upper surface of the substrate portion 10 vertically and a cantilever-shaped engaging head portion bending in a hook shape from the upper end part of the rising portion toward a forming region side of the first engaging element 11a (inner side of each engaging region 21 in the length direction).

A reinforcement portion reinforcing the second engaging element 11b is provided integrally to the rising portion on each second engaging element 11b. In Embodiment 1, an interval between the second engaging element 11b and the first engaging element 11a in the length direction is set to be approximately the same size as the attaching pitch of the first engaging element 11a in the length direction. It should be noted that a shape, a dimension and an attaching pitch of the first and second engaging elements 11a, 11b are not limited in particular, and can be changed arbitrarily.

The left and right vertical resin intrusion barrier portions 12 in Embodiment 1 have a first barrier portion (outer vertical wall row) 16a disposed at an outer side in the width direction and a second barrier portion (inner vertical wall row) 16b disposed at an inner side of the first barrier portion 16a (the center part side in the width direction) respectively. The first and second barrier portions 16a, 16b are composed of a plurality of vertical wall bodies 17 disposed in a row respectively and intermittently along the length direction. It should be noted that, in the present invention, a number (line number) of the barrier portion composing the vertical resin intrusion barrier portion 12 or a shape of the vertical wall body is not limited in particular.

Further, the vertical wall body 17 composed of the first and second barrier portions 16a, 16b is disposed at a predetermined attaching pitch intermittently along the front and rear direction, and a gap with a predetermined size is provided between respective vertical wall body 17 adjacent in the length direction. Moreover, the vertical wall body 17 of the outer first barrier portion 16a and the vertical wall body 17 of the inner second barrier portion 16b are disposed by moving the position alternately each other in the length direction so as to be in a staggered position in the length direction.

In this case, a front end part of the vertical wall body 17 of the first barrier portion 16a and a rear end part of the vertical wall body 17 of the second barrier portion 16b are connected each other by a wall connecting portion 18, and a rear end part of the vertical wall body 17 of the first barrier portion 16a and a front end part of the vertical wall body 17 of the second barrier portion 16b are connected each other by the wall connecting portion 18. In this case, the vertical wall body 17 of the first barrier portion 16a, the vertical wall body 17 of the second barrier portion 16b and the wall connecting portion 18 are formed so as the height dimensions from the upper surface of the substrate portion 10 to be the same.

The left and right vertical resin intrusion barrier portions 12 in Embodiment 1 are composed as above, thereby in foam molding of the cushion body it can be prevented that the foam resin material intrudes into the forming region of the first and second engaging elements 11a, 11b beyond the vertical resin intrusion barrier portions 12.

In the vertical resin intrusion barrier portion 12 in Embodiment 1, the molded surface fastener 1 can be bent in the upper and lower direction by spreading or narrowing a gap provided between the vertical wall bodies 17 of the first and second barrier portions 16a, 16b. Owing to this, it can be suppressed that a flexibility of the molded surface is inhibited by setting the left and right continuous wall portions.

Further, the left and right vertical resin intrusion barrier portions 12 are composed as above, thereby when the molded surface fastener 1 in Embodiment 1 is molded by using a die wheel 31 as described later, it can be suppressed that the obtained molded surface fastener 1 rolls back to the upper surface side of the substrate portion 10 on which the left and right vertical resin intrusion barrier portions 12 are provided.

The main lateral wall portion 13 in Embodiment 1 stands, as shown in FIG. 3, integrally from the upper surfaces of the front end edge part and the rear end edge part of the engaging region 21 on the substrate portion 10 and is composed of a continuous lateral wall body 13a disposed continuously over the left and right vertical resin intrusion barrier portions 12 along the width direction. The continuous lateral wall body 13a is disposed linearly with a constant height dimension from the substrate portion 10 and connected directly to the second barrier portion 16b of the left and right vertical resin intrusion barrier portions 12.

The main lateral wall portion 13 and a subsidiary lateral wall portion 14 adjacent to the forming region side of the first engaging element 11a of the main lateral wall portion 13 are disposed apart each other and in series. In this case, an interval between the continuous lateral wall body 13a of the main lateral wall portion 13 and a divided lateral wall body 14a of the subsidiary lateral wall portion 14 described later is set to be smaller than the size of the attaching pitch in the length direction of the first engaging element 11a.

Owing to this, since a forming region of the first engaging element 11a in the length direction of the molded surface fastener 1 can be secured large, the whole engagement force of the engaging element 11 of the molded surface fastener 1 can be enhanced. Moreover, it can be suppressed that the substrate portion 10 of the molded surface fastener 1 bends as rolling back in the width direction.

The subsidiary lateral wall portion 14 of Embodiment 1 is, as shown in FIG. 4, formed of a plurality of divided lateral wall bodies (subsidiary lateral wall bodies) 14a standing intermittently with a constant height dimension from the upper surface of the substrate portion 10 between the left and right vertical resin intrusion barrier portions 12 along the width direction and a plurality of second engaging elements 11b disposed between respective divided lateral wall bodies 14a.

Particularly, the subsidiary lateral wall portion 14 in Embodiment 1 is formed of six divided lateral wall bodies 14a lined linearly along the width direction and five second engaging elements 11b standing between these divided lateral wall bodies 14a. It should be noted that, in the present invention, the subsidiary lateral wall portion 14 may be composed of a single continuous lateral wall body disposed continuously over the left and right vertical resin intrusion barrier portions 12 along the width direction.

In Embodiment 1, each divided lateral wall body 14a stands on the upper surface of the substrate portion 10 and has a rectangular shape. The divided lateral wall body 14a and the second engaging element 11b disposed adjacent to each other are connected each other at the lower end part of the substrate portion 10 side. Owing to this, the divided lateral wall body 14a and the second engaging element 11b are reinforced each other and their strength are enhanced.

On the other hand, the upper end part of the divided lateral wall body 14a and the upper end part of the second engaging element 11b disposed adjacent to each other are formed apart so as to form a small interval between them. Owing to this, since freedom is given to the movement of the engaging head portion of the second engaging element 11b, in molding the molded surface fastener 1 using the die wheel 31 as described later, the second engaging element 11b can be easily pulled out from the cavity space of the die wheel 31, and the second engaging element 11b having a predetermined shape can be stably molded. It should be noted that the subsidiary lateral wall portion 14 is formed apart from the second barrier portion 16b of the left and right vertical resin intrusion barrier portions 12 but may be connected to the second barrier portion 16b depending on the disposing position of the subsidiary lateral wall portion 14.

In the subsidiary lateral wall portion 14 in Embodiment 1, the height dimension from the upper surface of the substrate portion 10 at the divided lateral wall body 14a and the height dimension from the upper surface of the substrate portion 10 at the second engaging element 11b are set to be the same size and also set to be the same size as the vertical wall body 17 disposed at the left and right vertical resin intrusion barrier portions 12, the first engaging element 11a and the continuous lateral wall body 13a of the main lateral wall portion 13.

That is, the molded surface fastener 1 in Embodiment 1 is formed so as each upper end position at the left and right vertical resin intrusion barrier portions 12, the first engaging element 11a, the main lateral wall portion 13 and the subsidiary lateral wall portion 14 to be disposed on the same flat surface. Owing to this, in foam molding of the cushion body by using the molded surface fastener 1 in Embodiment 1 as described later, the upper surface of the left and right vertical resin intrusion barrier portions 12 and the upper end surface of the main lateral wall portion 13 and the subsidiary lateral wall portion 14 can be stably and closely contacted to the flat cavity surface of the molding die. Thus, it can be prevented that the foam resin material 6 intrudes into the engaging element forming region of the engaging region 21 beyond the left and right vertical resin intrusion barrier portions 21, the main lateral wall portion 13 and the subsidiary lateral wall portion 14.

In Embodiment 1, left and right resistance adding wall portions 15 disposed in each space region 22 have a plurality of wall pieces 15a disposed on the extended line of the left and right vertical resin intrusion barrier portions 12 respectively. Particularly in Embodiment 1, the resistance adding wall portion 15 is formed of three wall pieces 15a standing from the substrate portion 10 independently from each other.

Further, the wall piece 15a forming the resistance adding wall portion 15 has the same shape and dimension as each vertical wall body 17 of the first and second vertical wall portions 17 at the vertical resin intrusion barrier portion 12. That is, the height dimension from the substrate portion 10 at each wall piece 15a is set to be the same size as the one from the substrate portion 10 at each vertical wall body 17 of the first and second vertical wall portions (See FIGS. 3 and 4). Further in the case of Embodiment 1, the vertical wall body 17 forming the first vertical wall portion of the vertical resin intrusion barrier portion 12 and the wall piece 15a forming the resistance adding wall portion 15 are disposed linearly in a row at a predetermined attaching pitch along the length direction.

Moreover, a predetermined interval 15b is provided between the wall pieces 15a adjacent to each other in the length direction of the resistance adding wall portion 15, and a size of each interval 15b is set so as the foam resin material of the cushion body to pass easily in foam molding of the cushion body in a state that the molded surface fastener 1 is attached to a predetermined position of the molding die for foam molding in a predetermined direction as described later.

An interval (space portion) 15b with such a size as above between the wall pieces 15a is provided at the resistance adding wall portion 15, thereby an intrusion-accepted space portion allowing the foam resin material to flow in the space region 22 of the molded surface fastener 1 in the width direction in foam molding of the cushion body. That is, by having such an intrusion-accepted space portion 15b as above, in foam molding of the cushion body, it is possible that the foam resin material intrudes into a center part of the space region 22 in the width direction by crossing the resistance adding wall portion 15 from one side of the left and right resistance adding wall portions 15 and from an outside to an inside of the wall piece 15a, and further that the foam resin material flows in the space region 22 of the molded surface fastener 1 in the width direction by flowing to the outside across the resistance adding wall portion 15 from the inside to the outside of the wall piece 15a at the other resistance adding wall portion 15.

Particularly in this case, in each left and right resistance adding wall portion 15, a total area of the whole intrusion-accepted space portion 15b formed per one space region 22 from the side view is set to be within the range of from 0.15 mm$^2$ to 20 mm$^2$. By providing the intrusion-accepted space portion 15b at the resistance adding wall portion 15 so as to have such a total area, the foam resin material can flow into the space region 22 smoothly across the resistance adding wall portion 15 in foam molding of the cushion body. At the same time, since a plurality of wall pieces 15a of the resistance adding wall portion 15 are positioned at a proper interval by interposing the intrusion-accepted space portion 15b when conveying the molded surface fastener 1 by a pair of upper and lower feed rollers 36a, 36b as described later, it can be prevented that the feed rollers 63a, 36b run idle in the space region 22 of the molded surface fastener 1 and the molded surface fastener 1 can be conveyed stably at a predetermined conveyance speed.

Further, in the molded surface fastener 1 in Embodiment 1 as above, magnetic particles composed of an alloy of iron, cobalt, nickel and the like is mixed in a part of synthetic resin consisting the molded surface fastener 1. Particularly in the molded surface fastener 1 in Embodiment 1, magnetic particles are mixed at a center part of the substrate portion 10 in the width direction over the whole length direction. It should be noted that the material of mixed magnetic particles is not limited as long as it is a material that can be attracted to a magnet magnetically.

Magnetic particles are mixed in the molded surface fastener 1 as above, thereby in a case that a magnet is disposed at a fastener holding portion of the molding die which is used for foam molding of the cushion body, the molded surface fastener 1 can be stably attracted and fixed to the fastener holding portion of the molding die in a predetermined close contact state by utilizing a magnetic force emerging between the magnet of the fastener holding portion and the magnetic particles mixed in the molded surface fastener 1.

Further, the magnetic particles are mixed in a part in the width direction in the substrate portion 10 over the whole length direction as above, thereby when holding the molded surface fastener 1 at the fastener holding portion of the molding die, a self-alignment effect capable of adjusting a position and a direction of the molded surface fastener 1 with respect to the fastener holding portion of the molding die automatically with high accuracy can be obtained.

It should be noted that, in the present invention, as long as the magnetic particles are mixed over the whole length direction in at least a part of the region of the molded surface fastener 1, the mixed region of the magnetic particles in the molded surface fastener 1 can be changed arbitrarily. For example, the magnetic particles can be mixed in the whole length and width directions of the molded surface fastener 1.

Further in the present invention, instead of mixing the magnetic particles in the synthetic resin consisting the molded surface fastener 1, the molded surface fastener 1 can be structured so as to be able to be attracted to the magnet magnetically by coating the magnetic particles on the lower surface (bottom surface) of the obtained molded surface fastener 1 after molding the molded surface fastener 1 at a predetermined shape.

Figure 5:
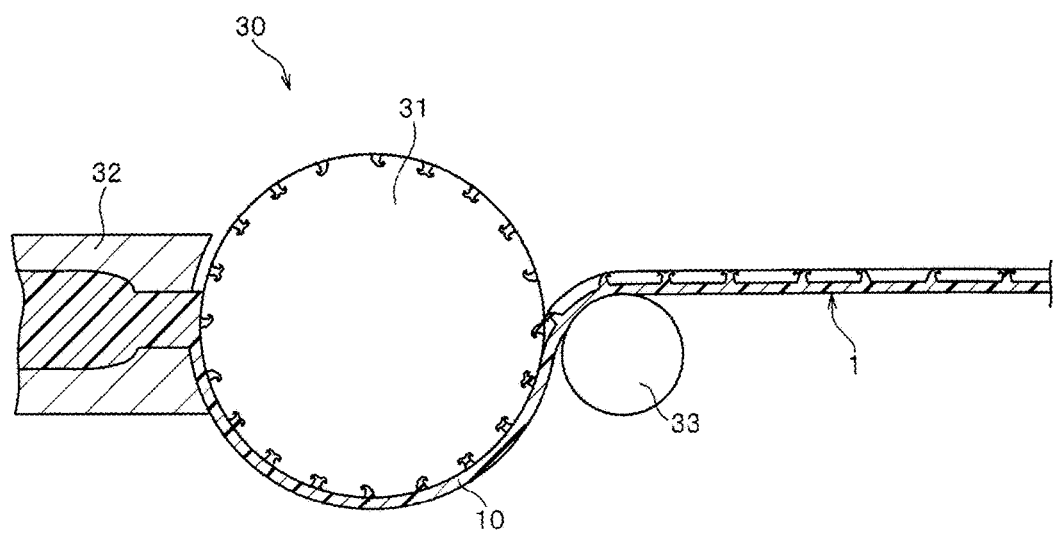
FIG. 5 is a schematic view explaining a molding process of the molded surface fastener.

The molded surface fastener 1 in Embodiment 1 having the above structure is manufactured by using a manufacturing apparatus (molding apparatus) 30 as shown, for example, in FIG. 5. It should be noted that, in the present invention, the manufacturing apparatus and the manufacturing method manufacturing the molded surface fastener 1 is not limited in particular and can be changed arbitrarily.

The manufacturing apparatus 30 of the molded surface fastener 1 shown in FIG. 5 has a die wheel 31 rotating drivingly in one direction, a continuous extrusion nozzle 32 of molten resin material disposed opposing to a periphery of the die wheel 31 and a pickup roller 33 disposed opposing to the periphery of the die wheel 31 on a downstream side of the continuous extrusion nozzle 32 in a rotation direction of the die wheel 31.

A molding cavity for molding the first and second engaging elements 11*a*, 11*b*, the left and right vertical resin intrusion barrier portions 12, the main lateral wall portion 13, the subsidiary lateral wall portion 14, the resistance adding wall portion 15 and the like of the molded surface fastener 1 described as above is formed on the periphery of the die wheel 31 of the manufacturing apparatus 30. The die wheel 31 distributes a coolant in the die wheel 31, and a coolant bath is disposed in a lower part of the die wheel 31 so as to impregnate a lower half part of the die wheel 31.

In a case of manufacturing the molded surface fastener 1 in Embodiment 1 shown in FIG. 1 by using such a manufacturing apparatus 30, first of all, molten resin material having a single main constituent or in which the magnetic particles are mixed partially is extruded continuously from the continuous extrusion nozzle 32 toward the periphery of the die wheel 31.

At this time, the die wheel 31 is rotating drivingly in one direction, and the molten resin material extruded on the periphery forms the substrate portion 10 of the molded surface fastener 1 between the continuous extrusion nozzle 32 and the die wheel 31. At the same time, the first and second engaging elements 11*a*, 11*b*, the left and right vertical resin intrusion barrier portions 12, the main lateral wall portion 13, the subsidiary lateral wall portion 14, the resistance adding wall portion 15 and the like are formed at the molding cavity of the die wheel 31 described above in series.

The molded surface fastener 1 formed on the periphery of the die wheel 31 is solidified by being held at the periphery of the die wheel 31, cooled and making a half-turn. After that, the molded surface fastener 1 is peeled off from the periphery of the die wheel 31 by the pickup roller 33 continuously.

At this time, in the molded surface fastener 1 in Embodiment 1, engaging regions 21 having the first and second engaging elements 11*a*, 11*b* and space regions 22 in which the first and second engaging elements 11*a*, 11*b* do not exist are formed alternately in the length direction. That is, the molded surface fastener 1 has a plurality of engaging regions 21 and the space region 22 disposed between each engaging region 21.

Moreover in this case, a strength of peeling resistance for peeling off from the periphery of the die wheel 31 by the pickup rollers 33 is different depending on the existence of the engaging element 11, and the peeling resistance emerging in the space region 22 in which the engaging elements 11 do not exist is smaller than the one emerging in the engaging region 21 in which the engaging elements 11 are disposed.

However, in the molded surface fastener 1 in Embodiment 1, since a plurality of wall pieces 15*a* of the resistance adding wall portion 15 are provided at the left and right side edge parts of the space region 22 continuously from the left and right vertical resin intrusion barrier portions 12 provided on the engaging region 21 along the length direction, the peeling resistance in the space region 22 emerging in peeling the molded surface fastener 1 off from the periphery of the die wheel 31 can be given by the resistance adding wall portion 15, and therefore, it can be suppressed that the peeling force peeling the molded surface fastener 1 becomes uneven in the length direction of the molded surface fastener 1.

That is, for example in a case that such wall pieces 15*a* as in Embodiment 1 are not provided in the space region 22 and the peeling resistance in the space region 22 is far smaller than the one in the engaging region 21, the difference of the peeling resistance between of the engaging region 21 and of the space region 22 becomes so large and the space region 22 can be peeled off from the periphery of the die wheel 31 easily by relatively weak force.

As a result, when pulling out the first engaging element 11*a* or the second engaging element 11*b* disposed near the space region 22 within the engaging region 21 from the cavity space of the die wheel 31, these first and second engaging elements 11a, 11b or the main lateral wall portion 13 receive a strong force and are pulled out forcibly, and shapes of the first and second engaging elements 11a, 11b or the main lateral wall portion 13 may be affected by deformation or breakage.

In contrast, in Embodiment 1, the wall pieces 15a are provided in the space region 22 intentionally and the peeling resistance of the space region 22 is made to be large so as to be close to the one of the engaging region 21. Owing to this, the force which the first and second engaging elements 11a, 11b disposed near the space region 22 within the engaging region 21 and the main lateral wall portion 13 receive when pulled out from the cavity space of the die wheel 31 can be small, thereby deformation or breakage of the first and second engaging elements 11a, 11b or the main lateral wall portion 13 can be prevented, and the molded surface fastener 1 having a predetermined shape can be stably formed.

Figure 6:
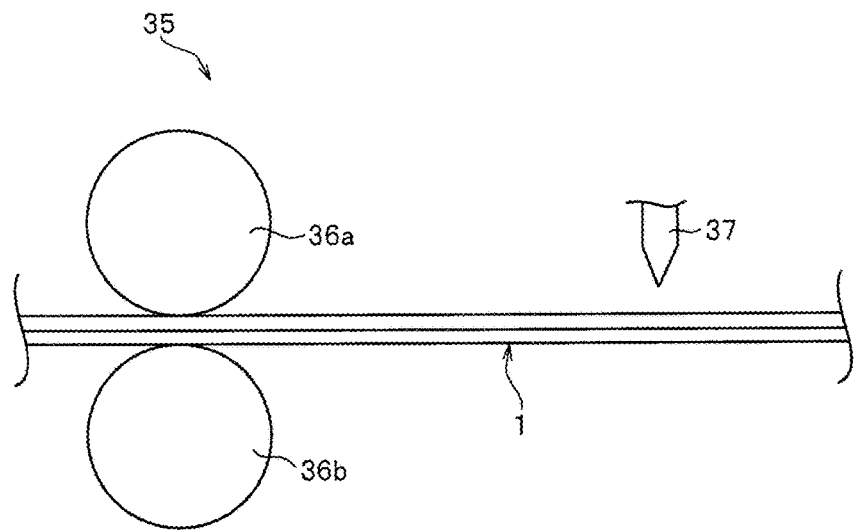
FIG. 6 is a schematic view explaining a process in which the molded surface fastener is carried and cut after molding.
Figure 7:
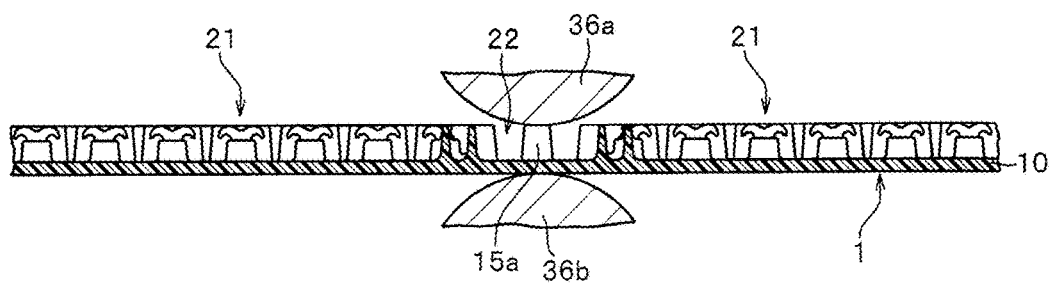
FIG. 7 is a main part enlarged view illustrating a state that upper and lower feed rollers hold the molded surface fastener.

The molded surface fastener 1 peeled off from the die wheel 31 is rolled up and collected in a longitudinal state at a collecting part not shown in Figures or conveyed toward a cutting apparatus 35 shown in FIG. 6, cut in a predetermined length by the cutting apparatus 35 and collected. It should be noted that, in Embodiment 1, it is also possible that the long molded surface fastener 1 is collected and stored and after that, when needed, the long molded surface fastener 1 stored is conveyed to the cutting apparatus 35 and brought in the cutting process.

Here, following is a specific explanation about the cutting apparatus 35 shown in FIG. 6.

The cutting apparatus 35 in FIG. 6 has a conveyance way not shown in Figures supporting and conveying the long molded surface fastener 1, a pair of upper and lower feed rollers 36a, 36b holding the molded surface fastener 1 from top and bottom sides and conveying to the downstream side and a cutter portion 37 which is disposed at the downstream side of the upper and lower feed rollers 36a, 36b and capable of moving up and down in the upper and lower direction. A tip cutting blade portion capable of cutting the molded surface fastener 1 linearly in the width direction is provided on a lower end of the cutter portion 37.

In a case that the long molded surface fastener 1 is cut in a predetermined length by using such a cutting apparatus 35, the molded surface fastener 1 is supported on the conveyance way, supplied between the upper and lower feed rollers 36a, 36b and held by the feed rollers 36a, 36b. Further, by rolling the upper and lower feed rollers 36a, 36b with a predetermined speed, the molded surface fastener 1 held between the feed rollers 36a, 36b is conveyed to the downstream side in a predetermined speed. At the same time, by moving the cutter portion 37 up and down with a predetermined timing, the molded surface fastener 1 (particularly the space region 22 of the molded surface fastener 1) is cut at the cutter portion 37.

At this time, in the molded surface fastener 1 in Embodiment 1, the vertical resin intrusion barrier portions 12 having a predetermined height dimension are provided at the left and right side edge parts of each engaging region 21 on the substrate portion 10, and the resistance adding wall portion 15 having the same height dimension as the vertical resin intrusion barrier portion 12 is provided at the left and right side edge portions of each space region on the substrate portion 10.

Here, for example in a case that the resistance adding wall portion 15 as in Embodiment 1 is not provided in the space region and the space region is formed of only a flat substrate portion, when the molded surface fastener is held by the upper and lower feed rollers 36a, 36b and conveyed, there is a possibility that the feed rollers 36a, 36b cannot hold the space region which does not have the resistance adding wall portion of the molded surface fastener stably, run idle and cannot convey the molded surface fastener. Moreover in this case, since the molded surface fastener cannot be conveyed within a predetermined time and in a predetermined distance, the length dimension of the cut molded surface fastener may vary when the molded surface fastener is cut by the cutter portion 37.

In contrast to this, in Embodiment 1, since the resistance adding wall portion 15 having a predetermined height dimension is provided in the space region 22 described as above, the upper and lower feed rollers 36a, 36b can stably hold not only the part of the engaging region 21 but also the part of the space region 22 in the molded surface fastener 1. Owing to this, it can be prevented that the feed rollers 36a, 36b run idle and the molded surface fastener 1 can be stably conveyed toward the downstream side at a predetermined conveyance speed.

Further, the conveyance of the molded surface fastener 1 becomes stable, thereby the cutting position at which the molded surface fastener 1 is cut by the cutter portion 37 becomes also stable. Thus, it is prevented that the difference of the length dimension of the molded surface fastener 1 cut by the cutter portion 37 occurs and the molded surface fastener having a predetermined length dimension shown in FIG. 1 can be stably obtained.

Then, the molded surface fastener 1 in Embodiment 1 manufactured by using the above method is integrated to a cushion body (foam body) at the same time of foam molding of the cushion body of, for example, a seat for an automobile.

Figure 8:
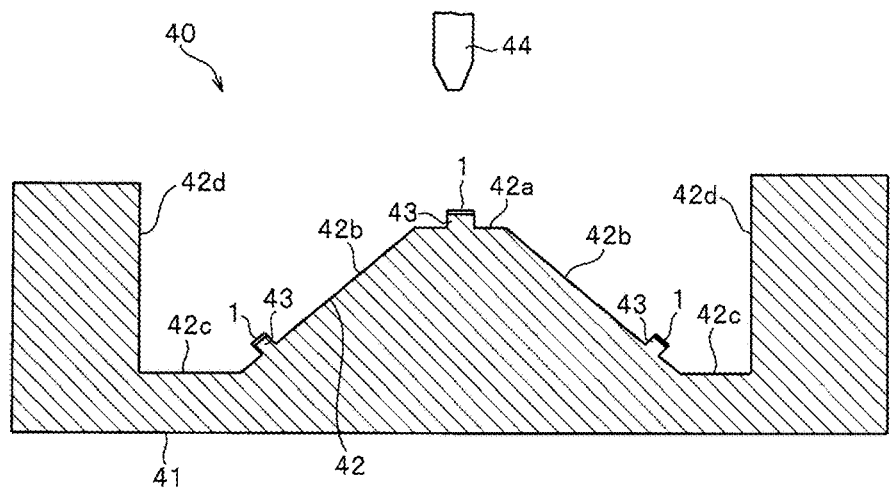
FIG. 8 is a schematic view illustrating a state that the molded surface fastener is held at a molding die for a cushion body.
Figure 9:
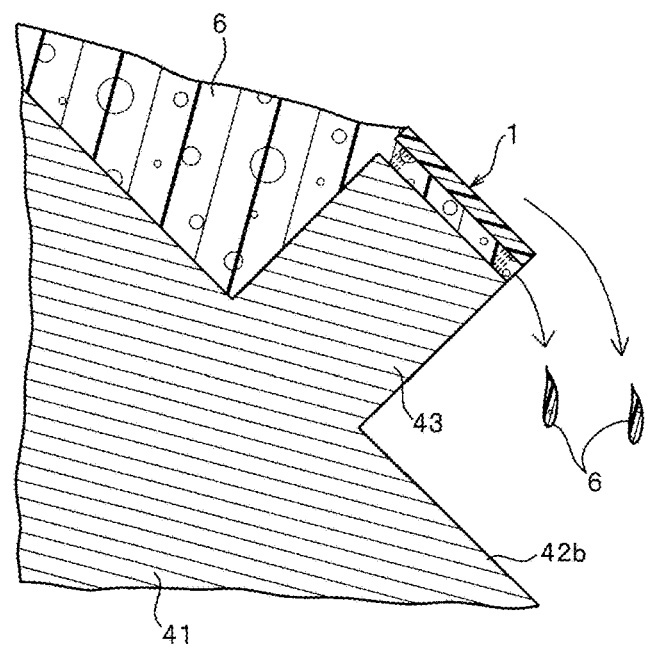
FIG. 9 is a schematic view explaining a state that a foam resin material flows in the molded surface fastener in a width direction.

Here, following is a specific explanation about the foam molding of the cushion body referencing FIGS. 8 and 9.

A molding die 40 used for molding the cushion body has a lower mold (fixing mold) 41 shown in FIG. 8, an upper mold (mobile mold) not shown in Figures and an injection nozzle 44 spraying a foam resin material to a cavity space formed in the upper mold and lower mold 41. It should be noted that, in the present invention, a shape or a structure of the molding die 40 is not limited and can be changed arbitrarily.

A cavity surface 42 of the lower mold 41 in Embodiment 1 is formed so as to have a cross-sectional shape which a center part of the lower mold 41 is raised like a mountain. The cavity surface 42 has a top portion 42a disposed at the center part, a sloped portion 42b formed by a sloped surface declining from the top portion 42a, a bottom surface portion 42c formed outside of the sloped portion 42b and a side wall surface portion 42d formed so as to erect from the bottom surface portion 42c.

Further, three surface fastener attaching portions 43 in which the molded surface fastener 1 is put and held on the tip end surface are disposed at the lower mold 41, and these surface fastener attaching portions 43 are provided on the top portion 42a and the sloped portion 42b of the cavity surface 42. In this case, the surface fastener attaching portion 43 is provided by protruding from the cavity surface 42 toward a direction perpendicular to the cavity surface 42, and the tip end surface of the surface fastener attaching portion 43 (a holding surface of the molded surface fastener 1) is formed parallel to the cavity surface 42.

Although the tip end surface (holding surface) of each surface fastener attaching portion 43 is formed as a flat surface so as to be capable of putting the molded surface on, in the present invention, it may be formed by a curved surface bending as a convex surface shape or a concave surface shape in the longitudinal direction of the molded surface fastener 1. Further, a magnet such as neodymium magnet and the like is buried inside or near each surface fastener attaching portion 43 in the lower mold 41 corresponding to a position of the surface fastener attaching portion 43.

Therefore, the molded surface fastener 1 is put on the surface fastener attaching portion 43 of the lower mold 41 so as the upper surface of the molded surface fastener 1 to be opposed, thereby the magnetic particles mixed in the molded surface fastener 1 are attracted by the attracting force of the magnet. Owing to this, the molded surface fastener 1 is adhered and fixed to the tip end surface of the surface fastener attaching portion 43 of the molding die 40 shown in FIG. 8, and the position and the direction of the molded surface fastener 1 with respect to the molding die 40 can be adjusted automatically with high accuracy by a self-alignment effect.

Further, the molded surface fastener 1 is fixed at the tip end surface of the surface fastener attaching portion 43 as above, thereby respective upper surfaces of the left and right vertical resin intrusion barrier portions 12, the main lateral wall portion 13 and the subsidiary lateral wall portion 14 in the molded surface fastener 1 are held in a state of closely contacting to a flat tip end surface of the surface fastener attaching portion 43. It should be noted that, in this case, in the surface fastener attaching portion 43 provided on the sloped portion 42b of the cavity surface 42, the molded surface fastener 1 is fixed on the tip end surface in a state of sloping obliquely in the same direction as the sloped surface of the sloped portion 42b of the cavity surface 42.

Then, the foam resin material is sprayed from the injection nozzle 44 and injected into the molding die 40 in which the molded surface fastener 1 is fixed at each surface fastener attaching portion 43. At this time, the foam resin material is sprayed from the injection nozzle 44 by moving the injection nozzle 44 with respect to the molding die 40 relatively, for example, thereby the foam resin material can be injected throughout the cavity space of the molding die 40. Further, after a predetermined amount of the foam resin material is injected from the injecting nozzle 44, the upper mold is moved toward the lower mold 41 and the molding die 40 is clamped. Thus, the foam resin material is foamed and spread throughout the whole cavity space of the molding die 40 and the cushion body is molded.

At this time, since the molded surface fastener 1 is fixed at the surface fastener attaching portion 43 at a predetermined position by an attracting effect of the magnet disposed in the molding die 40, it can be prevented that the position of the molded surface fastener 1 is moved by the flux pressure or the expanding pressure of the foam resin material.

Particularly in Embodiment 1, for example in a case that the foam resin material is sprayed strongly and directly from the moved injection nozzle 44 to the molded surface fastener 1 fixed at the sloped portion 42b side of the cavity surface 42, since the intrusion-accepted space portion (an interval between the wall pieces 15a) is provided at the resistance adding wall portion 15 of the molded surface fastener 1, thereby the foam resin material can be flowed into the space region 22 in the width direction via the intrusion-accepted space portion 15b and thereby it is prevented that the molded surface fastener 1 receives the total momentum of the foam resin material and the flux pressure or the expanding pressure of the foam resin material can be easily weaken. Owing to this, it can be effectively prevented that the position of the molded surface fastener 1 is misaligned or the molded surface fastener 1 is floated from the surface fastener attaching portion 43 of the molding die 40.

Further, for example shown in FIG. 9, when the foam resin material 6 is sprayed from the injection nozzle 44 into the cavity space of the molding die 40, the foam resin material 6 is stopped at the surface fastener attaching portion 43 provided at the sloped portion 42b side of the cavity surface 42, and the foam resin material 6 may be piled at a foot side of the surface fastener attaching portion 43.

In this case, for example if the intrusion-accepted space portion 15b is not provided at the resistance adding wall portion 15 of the molded surface fastener 1, the foam resin material 6 cannot flow to the lower side of the surface fastener attaching portion 43 unless it goes beyond the bottom surface (lower surface) side of the molded surface fastener 1 held at the surface fastener attaching portion 43. However, the intrusion-accepted space portion 15b is provided at the resistance adding wall portion 15 as in the molded surface fastener 1 in Embodiment 1, thereby it becomes possible that the foam resin material 6 can flow in the space region 22 in the width direction via the intrusion-accepted space portion 15b of the resistance adding wall portion 15. Owing to this, it becomes possible that the foam resin material 6 flows into the lower side of the surface fastener attaching portion 43 more easily and accordingly it becomes possible that the foam resin material 6 spreads throughout the whole cavity space more smoothly.

Further, in the molded surface fastener 1 in Embodiment 1, as described above, since respective upper surfaces of the left and right vertical resin intrusion barrier portions 12, the main lateral wall portion 13 and the subsidiary lateral wall portion 14 are held in a state of closely contact to the flat tip end surface of the surface fastener attaching portion 43, it can be stably prevented that the foam resin material 6 intrudes into the foaming region of the first and second engaging elements 11a, 11b beyond the left and right vertical resin intrusion barrier portions 12, the main lateral wall portion 13 and the subsidiary lateral wall portion 14 and also effectively prevented that the first and second engaging elements 11a, 11b are buried into the cushion body.

Figure 10:
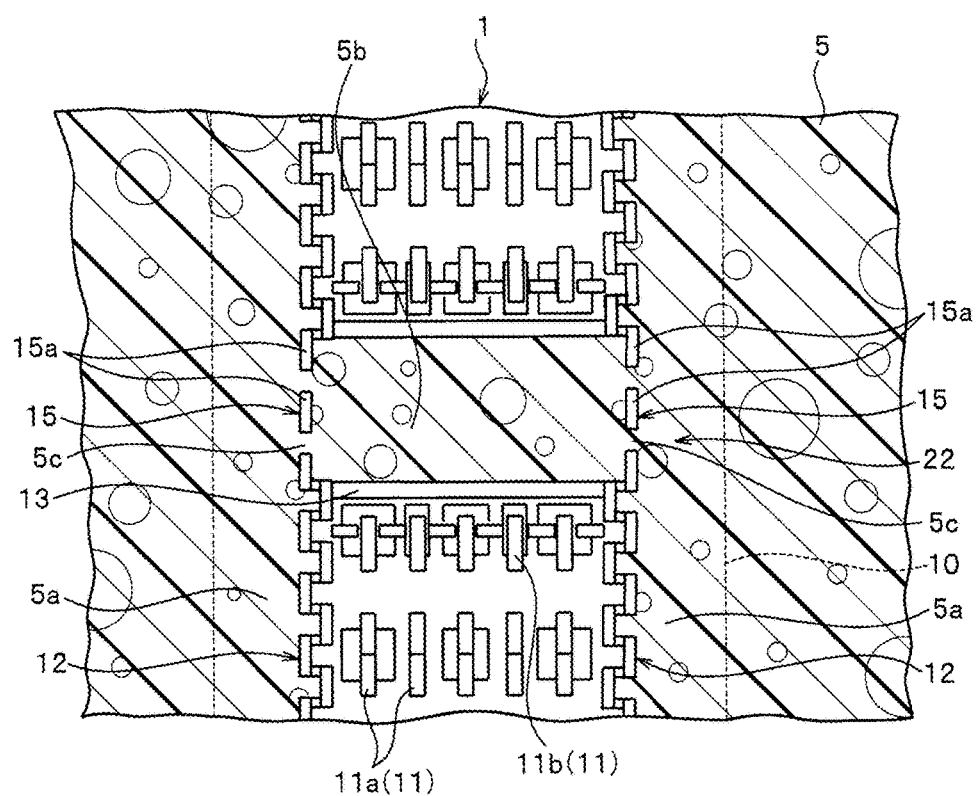
FIG. 10 is a main part enlarged view illustrating a surface of the cushion body to which the molded surface fastener is integrated.

After that, the foam resin material 6 are foam solidified and the molding finishes, thereby the cushion body 5 to which the molded surface fastener 1 in Embodiment 1 is integrated as shown in FIG. 10 can be obtained.

In the cushion body 5 with the molded surface fastener 1 obtained in this way, the first and second engaging elements 11a, 11b disposed within the engaging element forming region surrounded by the left and right vertical resin intrusion barrier portions 12 and the front and rear main lateral wall portions 13 in the engaging region 21 can be exposed without being buried into the cushion body 5. Therefore, a predetermined engagement force obtained by the first and second engaging elements 11a, 11b of the molded surface fastener 1 can be stably secured.

Accordingly, a skin material covers on a surface of the cushion body 5 and the skin material is pressed toward the molded surface fastener 1 integrated to the cushion body 5, thereby the loop-shaped engaging elements 11 disposed on the bottom surface of the skin material can be engaged with the first and second engaging elements 11a, 11b of the molded surface fastener 1 stably. Owing to this, the skin material can be attached precisely along the surface of the cushion body 5 without floating from the cushion body 5.

Further, in the cushion body 5 to which the molded surface fastener 1 in Embodiment 1 is integrated, since the foam resin material 6 also flows into the upper surface side of the space region 22 of the molded surface fastener 1 and foam solidifies in foam molding, the substrate portion 10 and the resistance adding wall portion 15 in the space region 22 of the molded surface fastener 1 are buried inside of the cushion body 5 as shown in FIG. 10.

In this case, the whole lower surface (bottom surface) of the molded surface fastener 1, the outer side surfaces of the left and right vertical resin intrusion barrier portions 12 and the upper surface (top surface) of each space region 22 are fixed to the cushion body 5 by a surface contact. Particularly, an outer side cushion part 5a to which the outer side surfaces of the left and right vertical resin intrusion barrier portions 12 are fixed and an inner side cushion part 5b to which upper surfaces inside of the left and right resistance adding wall portions 15 on the substrate portion 10 in the space region 22 in the cushion body 5 are fixed are connected continuously and formed integrally via the cushion part 5c passing through the intrusion-accepted space portion 15b. Owing to this, the attachment strength of the molded surface fastener 1 with respect to the cushion body 5 can be effectively enhanced and the molded surface fastener 1 is firmly integrated to the cushion body 5.

It should be noted that, in the above Embodiment 1, the left and right resistance adding wall portions 15 disposed in the space region 22 of the molded surface fastener 1 has three wall pieces 15a, and an interval 15b between the adjacent wall pieces 15a is set to be the same size as the one between the vertical wall bodies 17 in the first vertical wall portion of the vertical resin intrusion barrier portion 12.

However, in the present invention, the disposed number of the wall piece 15a forming the resistance adding wall portion 15 or a size and a shape of the wall piece 15a are not limited in particular, and the interval between the wall pieces 15a can be changed arbitrarily as long as the foam resin material 6 can be passed in foam molding of the cushion body 5.

It should be noted that, in the above manufacturing method, though it is explained that the foam resin material 6 is foamed after passing from one side part in the space region 22 to the other side part, it is not always needed in manufacturing the cushion body 5. For example, the foam resin material 6 may flow from both left and right side parts of the space region 22 toward a center part in the width direction, contact and foam on the space region 22. That is, in the present invention, the in-flow direction of the foam resin material 6 with respect to the space region of the molded surface fastener is not limited as long as the foam resin material 6 foams and solidifies on the space region 22 in a continuous state in the width direction, as shown in FIG. 10.

Figure 11:
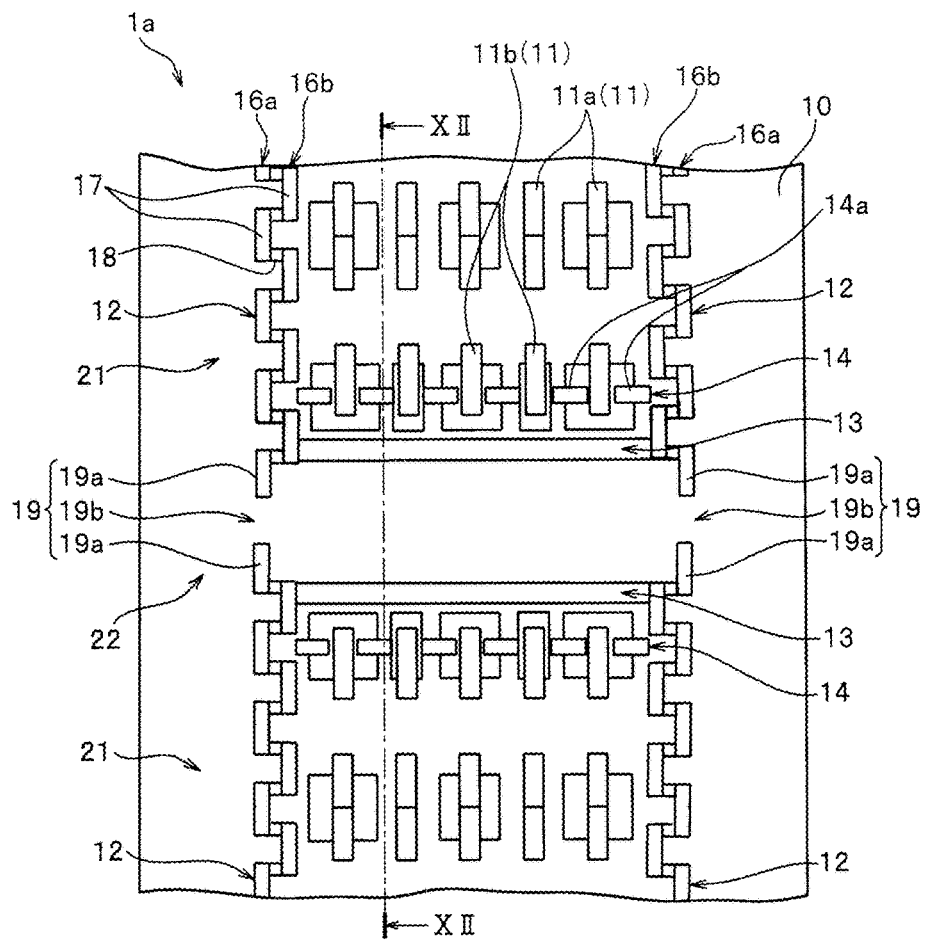
FIG. 11 is a plan view illustrating a main part of a molded surface fastener according to a modification embodiment in Embodiment 1 of the present invention.
Figure 12:
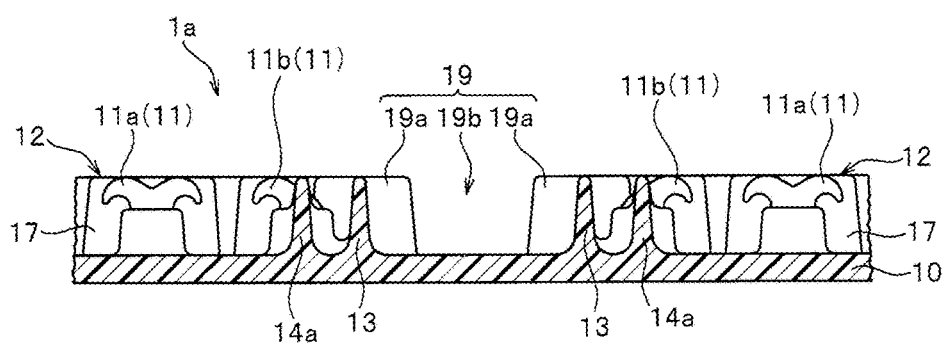
FIG. 12 a cross-sectional view in XII-XII line shown in FIG. 11.

Here, main parts of a molded surface fastener according to a modification embodiment in Embodiment 1 (space region and the near part of it) are shown in FIGS. 11 and 12. It should be noted that, in the molded surface fastener 1a according to the modification embodiment, the same reference signs are used about the parts and members having substantially the same structure as in the molded surface fastener 1 according to the above Embodiment 1 and the explanation is omitted by that.

As shown in FIGS. 11 and 12, in the molded surface fastener 1a according to the modification embodiment, the left and right resistance adding wall portions 19 disposed in the space region 22 are formed of two wall pieces 19a respectively and an interval between these two wall pieces 19b (intrusion-accepted space portion) is provided to be larger than the interval between the vertical wall bodies 17 in the first barrier portion 16a of the vertical resin intrusion barrier portion 12. In this case, each intrusion-accepted space portion 19b formed at the left and right resistance adding wall portions 19 in one space region 22 has a total area from 0.15 mm$^2$ to 20 mm$^2$ from the side view respectively.

Further in the modification embodiment, the wall piece 19a of the resistance adding wall portion 19 is connected directly to the vertical resin intrusion barrier portion 12 (particularly the wall connecting portion 18 of the vertical resin intrusion barrier portion 12). It should be noted that, in the present invention, the wall piece 19a of the resistance adding wall portion 19 may be provided at a position which is apart from the vertical resin intrusion barrier portion 12. In this case, it is preferable that an interval having a size with which the foam resin material 6 can pass easily in foam molding of the cushion body 5 is provided between the wall piece 19a of the resistance adding wall portion 19 and the vertical resin intrusion barrier portion 12 (for example, the vertical wall body 17 of the vertical resin intrusion barrier portion 12).

By the molded surface fastener 1a according to such a modification embodiment as above, the same effect as in the molded surface fastener 1 according to the above Embodiment 1 can be obtained and the length dimension of the space region 22 can be shortened. Accordingly, in the molded surface fastener 1a, a relative size (area) of the space region 22 with respect to the engaging region 21 can be smaller than in the above Embodiment 1, and the engaging region 21 can be secured largely. Therefore, in the cushion body 5 to which the molded surface fastener 1a is integrated, the first and second engaging elements 11a, 11b of the molded surface fastener 1a can be exposed at a larger area, and the engagement force with respect to the skin material can be enhanced.

Embodiment 2

Figure 13:
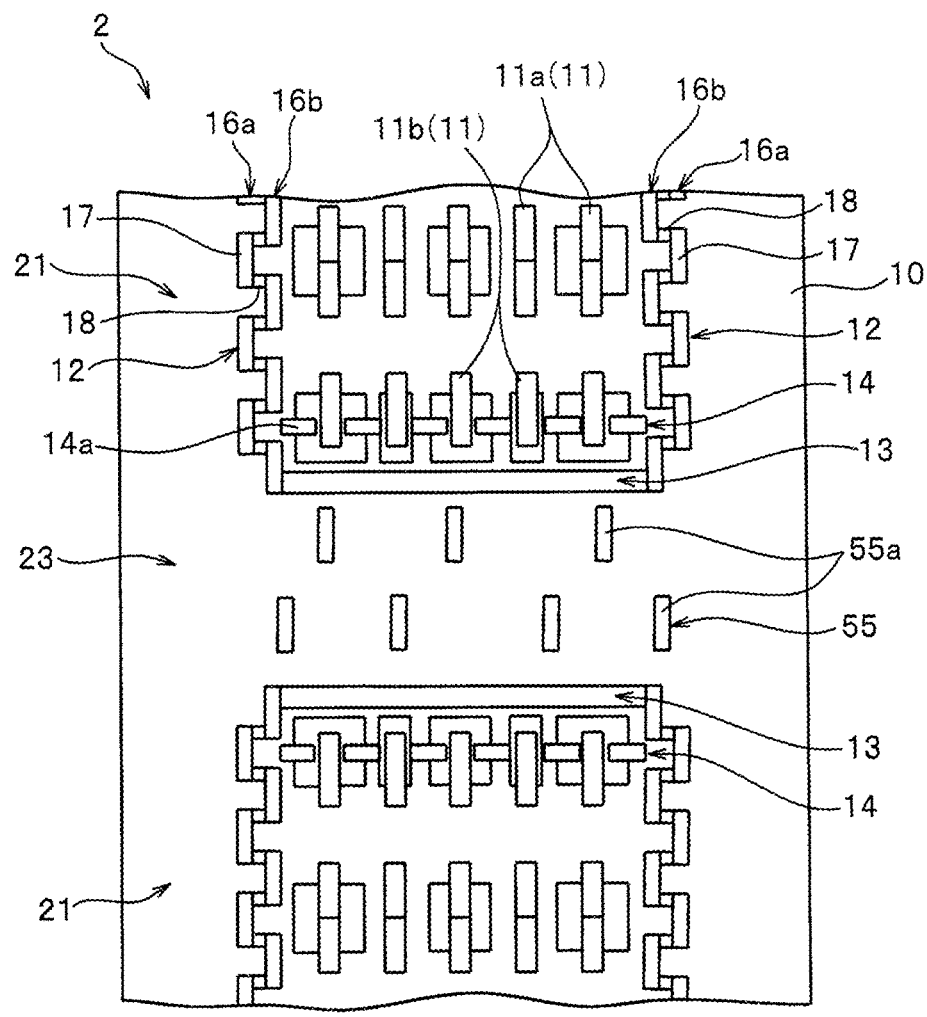
FIG. 13 is a plan view illustrating a main part of a molded surface fastener according to Embodiment 2 of the present invention.

FIG. 13 is a plan view illustrating a main part of a molded surface fastener according to Embodiment 2 of the present invention.

It should be noted that, in the molded surface fastener 2 according to Embodiment 2 shown as below and the molded surface fasteners 3, 4 according to Embodiments 3, 4 described later, the different structure from the molded surface fastener 1 according to Embodiment 1 as described above is mainly explained and the explanation about the part and member having substantially the same structure as in the molded surface fastener 1 according to the above Embodiment 1 is not described but represented by the same reference signs.

The molded surface fastener 2 according to Embodiment 2 has a thin plate-shaped substrate portion 10, and an engaging region 21 in which a plurality of hook-shaped engaging elements 11 stand on an upper surface and a space region which has a flat surface in which engaging elements 11 do not exist are disposed alternately on the substrate portion 10 in a length direction.

Each engaging region 21 is formed with a predetermined interval in the length direction. Further in Embodiment 2, the first and second engaging elements 11a, 11b disposed in the engaging region 21, left and right vertical resin intrusion barrier portions 12, front and rear main lateral wall portions 13 and a subsidiary lateral wall portion 14 have the same structures as in the molded surface fastener 1 in the above Embodiment 1.

A plurality of wall pieces 55a stand from the substrate portion 10 as a resistance adding wall portion 55 independently and separately in each space region 23 of the molded surface fastener 2. Particularly in the case of Embodiment 2, seven wall pieces 55a are disposed between the adjacent main lateral wall portions 13 in the length direction and in the width direction in a balanced manner.

In this case, an interval between the wall pieces 55a and an interval between the wall piece 55a and a vertical wall body 17 of the vertical resin intrusion barrier portion 12 or the main lateral wall portion 13 have an enough size for foam resin material 6 of a cushion body 5 to be able to pass easily in foam molding of the cushion body 5. By these intervals, an intrusion-accepted space portion which allows the foam resin material 6 to flow in the space region 23 of the molded surface fastener 2 in the width direction is configured. Further, a height dimension from the substrate portion 10 at each wall piece 55a is set to be the same size as the one from the substrate portion 10 at each vertical wall body 17 of the first and second barrier portions 16a, 16b.

The molded surface fastener 2 in Embodiment 2 as described above is manufactured by using a manufacturing apparatus 30 having a die wheel 31 in which a predetermined molding cavity is formed on the periphery shown in FIG. 5, as in the case of above Embodiment 1.

In this case, a plurality of wall pieces 55a are provided in the space region 23 of the molded surface fastener 2 in Embodiment 2, thereby in the manufacturing process of the molded surface fastener 2, when a long molded surface fastener 2 molded on the periphery of the die wheel 31 is peeled off continuously by a pickup roller 33 from the periphery of the die wheel 31, it can be suppressed that a peeling force for the molded surface fastener 2 becomes uneven in the length direction of the molded surface fastener 2 as in the case of the above Embodiment 1. Thus, it is prevented that deformation or breakage occurs in the first and second engaging elements 11a, 11b and the main lateral wall portion 13 disposed in the engaging region 21 of the molded surface fastener 2, and the molded surface fastener 2 having a predetermined shape can be formed stably.

After that, when a cutting process is made for the molded surface fastener 2 by using a cutting apparatus 35 as shown in FIG. 6, since a plurality of wall pieces 55a are provided in the space region 23 of the molded surface fastener 2 as described above, the molded surface fastener 2 can be stably held by upper and lower feed rollers 36a, 36b over the whole length direction.

Owing to this, it is prevented that the feed rollers 36a, 36b run idle, and the molded surface fastener 2 can be conveyed stably toward the downstream side at a predetermined conveyance speed. Moreover, it is prevented that the length dimensions of the molded surface fasteners 2 cut by a cutter portion 37 vary, and the molded surface fastener 2 having a predetermined length dimension can be stably obtained.

Then, the cushion body 5 is foam molded in a state that the molded surface fastener 2 in Embodiment 2 is fixed to a molding die 40 as in the case of the above Embodiment 1, thereby the cushion body 5 in which the molded surface fastener 2 is fixed firmly to a predetermined position in a state of burying the space region 23 and the first and second engaging elements 11a, 11b of the engaging region 21 are exposed outside can be stably manufactured.

It should be noted that, in Embodiment 2, though the space region was explained as it has a flat surface in which the engaging elements 11 do not exist, each wall piece 55a may have a hook shape. In this case, since the space region 23 is buried into the foam resin when integrated to a surface of the cushion body 5, and each wall piece buries into the cushion body 5, the wall piece having a hook shape disposed in the space region 23 does not function as an engaging element.

Embodiment 3

Figure 14:
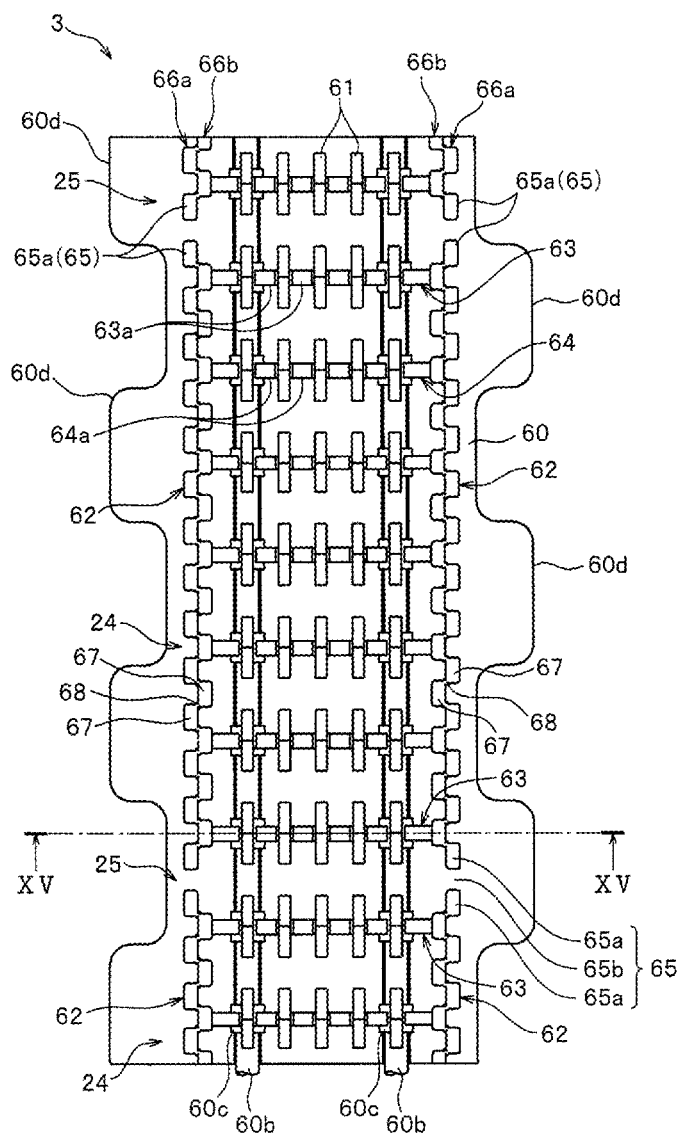
FIG. 14 is a plan view illustrating a molded surface fastener according to Embodiment 3 of the present invention.
Figure 15:
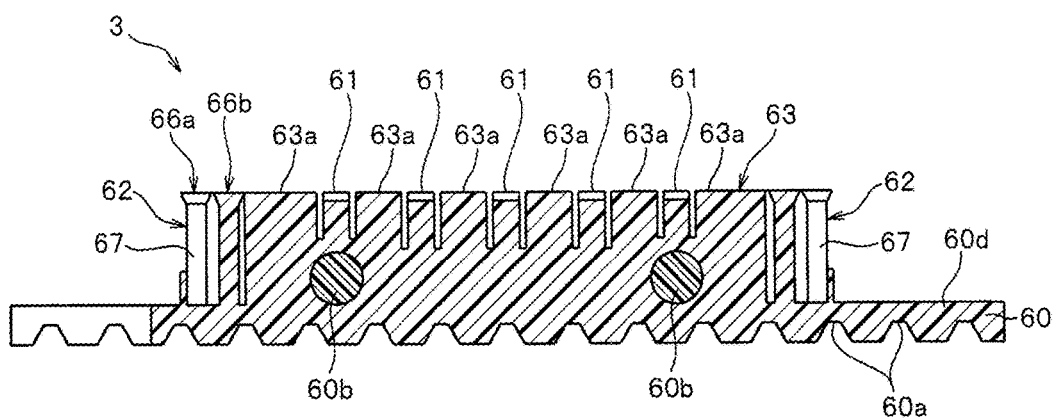
FIG. 15 is a cross-sectional view in XV-XV line shown in FIG. 14.

FIG. 14 is a plan view illustrating a molded surface fastener according to Embodiment 3. FIG. 15 is a cross-sectional view in XV-XV line shown in FIG. 14.

The molded surface fastener 3 according to Embodiment 3 has a flat plate-shaped substrate portion 60, and a plurality of concave groove portions 60a (or convex-shaped raised portions) parallel to a front and rear direction are provided on a lower surface side of the substrate portion 60 as shown in FIG. 15. The substrate portion 60 has such a plurality of concave groove portions 60a (or convex-shaped raised portions), thereby when the molded surface fastener 3 is integrated to a cushion body 5 in foam molding of the cushion body 5, a contact area between the molded surface fastener 3 and the cushion body 5 is made large and an fixing strength of the molded surface fastener 3 with respect to the cushion body 5 can be enhanced.

Further, an engaging region 24 in which a plurality of hook-shaped engaging elements 61 stand on an upper surface and a space region 25 whose dimension in the length direction is set to be small are disposed alternately in the length direction on the substrate portion 60 in Embodiment 3. Moreover, the molded surface fastener 3 has left and right fin piece portions 60d extending from left and right side edges of the base portion toward outside of the width direction as a tongue shape, left and right linear magnetic materials 60b disposed along the front and rear direction and a fixing portion 60c fixing the linear magnetic material 60b at a predetermined interval.

In Embodiment 3, the left fin piece portions 60d and the right fin piece portions 60d are disposed staggering at a predetermined attaching pitch in the length direction. Further, upper and lower surfaces of the left and right fin piece portions 60d are disposed on the same flat surface as the ones of the substrate portion. These left and right fin piece portions 60d are parts which are buried into the cushion body 5 in foam molding of the cushion body 5. By having such fin piece portions 60d, a fixing strength of the molded surface fastener 3 with respect to the cushion body 5 can be enhanced.

The left and right linear magnetic materials 60b are integrally molded so as to be fixed to the fixing portion 60c by introducing the linear magnetic materials 60b into a part in which the fixing portion 60c of the molded surface fastener 3 is formed when the molded surface fastener 3 is molded by using a manufacturing apparatus 30 having a die wheel 31.

Further, the linear magnetic material 60b is disposed along the longitudinal line of the engaging elements 61 disposed at the nearest of the left and right vertical resin intrusion barrier portions 62 of the molded surface fastener 3 as described later. Each linear magnetic material 60b has a circular cross-section and is made of a material attracting or attracted magnetically.

Such linear magnetic materials 60b are disposed in the molded surface fastener 3, thereby in foam molding of the cushion body 5 by using the molding die 40 (lower mold 41) as described above and shown in FIG. 8, a magnetic force emerging between the magnet provided in the molding die 40 and the linear magnetic material 60b of the molded surface fastener 3 can be utilized. Thus, the molded surface fastener 3 can be attracted and fixed stably in a predetermined close contact state to the cavity surface of the molding die 40, and a self-alignment effect capable of adjusting a position and a direction of the molded surface fastener 3 with respect to a fastener holding portion of the molding die 40 automatically with high accuracy can be obtained.

In this case, monofilament in which magnetic particles composed of an alloy of iron, cobalt, nickel and the like are mixed in a synthetic resin such as polyester and the like or a metal twisted thread made by binding and twisting narrow metal threads made of these alloys can be used as a material of the linear material attracted magnetically.

The fixing portions 60c fixing the linear magnetic material 60b to the substrate portion 60 are disposed at a predetermined interval along the length direction and has a shape protruding as a block shape whose cross section is rectangular so as to embrace the linear magnetic material 60b from an upper surface of the substrate portion 60. The linear magnetic material 60b is buried within the fixing portion 60c so as to penetrate the fixing portion 60c in the length direction. Further, each fixing portion 60c is formed integrally to the engaging element 61 and a divided lateral wall body 64a of the main lateral wall portion 63 as described later or the divided lateral wall body 64a of an auxiliary lateral wall portion 64 as described later.

It should be noted that, in the present invention, the fixing portion 60c may be positioned on the lower surface side of the substrate portion 60, and the linear magnetic material 60b may be fixed on the lower side of the substrate portion 60, for example. Instead of fixing the linear magnetic material 60b to the substrate portion 60, it is possible that the molded surface fastener 3 has magnetism by mixing the magnetic particles into a part of synthetic resin composing the substrate portion 60 of the molded surface fastener 3, as in the molded surface fastener 1 of the above Embodiment 1.

In the molded surface fastener 3 in Embodiment 3, each engaging region 24 has a plurality of hook-shaped engaging element 61, a pair of left and right vertical resin intrusion barrier portions 62 standing on the left and right side edge parts of the substrate portion 60 along the length direction so as to interpose a plurality of engaging elements 61, front and rear main lateral wall portions 63 standing at front and rear end edge parts of each engaging region 24 along the width direction and computing the engaging region 24 and the space region 25 and a plurality of auxiliary lateral wall portions 64 disposed between the front and rear main lateral wall portions 63 along the width direction.

A plurality of engaging elements 61 in Embodiment 3 stand on an upper surface of the substrate portion 60 in rows in the length and width directions at predetermined attaching pitches. Particularly the engaging elements 61 of each engaging region 24 in Embodiment 3 are disposed in five lines between the left and right vertical resin intrusion barrier portions 62 in the length direction (longitudinal direction) and disposed in seven lines in the width direction (lateral direction).

Further, each engaging element 61 has a rising portion standing from the upper surface of the substrate portion 60 vertically and a hook-shaped engaging head portion branching and bending from the upper end part of the rising portion in the front and rear direction, and is formed as the same shape as the first engaging element 11a in the above Embodiment 1. A height dimension from the upper surface of the substrate portion 60 in each engaging element 61 is set to be the same size as the ones at a vertical wall body 67 of the vertical resin intrusion barrier portion 62 as described later, a divided lateral wall body 63a of the main lateral wall portion 63 as described later and a divided lateral wall body 64a of the auxiliary lateral wall portion 64.

The left and right vertical resin intrusion barrier portions 62 in Embodiment 3 are disposed at a position inside of the left and right outer side edges of the substrate portion 60 in the width direction. Each vertical resin intrusion barrier portion 62 has a first barrier portion (outer vertical wall row) 66a disposed at an outer side in the width direction, a second barrier portion (inner vertical wall row) 66b disposed at an inner side of the first barrier portion 66a and a connecting portion 68 connecting between the first and second barrier portions 66a, 66b. Further, the first and second barrier portions 66a, 66b are composed of a plurality of vertical wall bodies 67 disposed intermittently in a row along the length direction respectively.

The vertical wall bodies 67 composing the first and second barrier portions 66a, 66b are disposed intermittently at a predetermined attaching pitch along the front and rear direction and a predetermined gap is provided between respective vertical wall bodies 67 adjacent in the length direction. Further, the vertical wall body 67 of the first barrier portion 66a on the outside and the vertical wall body 67 of the second barrier portion 66b on the inside are disposed by moving the position alternately in the length direction with a half size of the attaching pitch so as to be in the staggered position in the length direction and be a staggered shape.

Each vertical wall body 67 has a post portion raised from the base portion and an upper surface part disposed on an upper end of the post portion. The post portion of each vertical wall body 67 is in a square pyramid shape which is long and thin in the length direction and the post portion is approximately trapezoidal-shaped when viewing the post portion from the left and right side wall surface sides. The upper surface part of each vertical wall body 67 is formed to hang in the length and width directions more than the upper end of the post portion, and the upper surface of the upper surface part (tip end surface) is formed to be flat.

Owing to this, when the molded surface fastener 3 is attached to a flat tip end surface of the surface fastener attaching portion 43 in the above molding die 40 as shown, for example, in FIG. 8, a contact of the molded surface fastener 3 can be improved by making a contact area between the first and second barrier portions 66a, 66b of the molded surface fastener 3 and the tip end surface of the surface fastener attaching portion 43 of the molding die 40 large.

A connecting portion 68 connecting between the first and second barrier portions 66a, 66b of the vertical resin intrusion barrier portion 62 is disposed so as to connect a front end part of the vertical wall body 67 of the first barrier portion 66a and a rear end part of the vertical wall body 67 of the second barrier portion 66b each other as well as a rear end part of the vertical wall body 67 of the first barrier portion 66a and a front end part of the vertical wall body 67 of the second barrier portion 66b each other. Moreover, a height dimension from the base portion in each connecting portion 68 is set to be the same size as the one from the base portion in the vertical wall body 67 of the first and second barrier portions 66a, 66b.

The left and right vertical resin intrusion barrier portions 62 in Embodiment 3 is structured as above, thereby in the foam molding process of the cushion body 5, the molded surface fastener 3 is attracted and fixed to the surface fastener attaching portion 43 of the molding die 40 in a predetermined direction, and an outer side region of the vertical resin intrusion barrier portion 62 and a forming region of the engaging element 61 in the engaging region 24 are separated by the vertical resin intrusion barrier portion 62. Therefore, it can be stably prevented that the foam resin material 6 intrudes into the forming region of the engaging element 61 beyond the vertical resin intrusion barrier portion 62. Moreover, in the vertical resin intrusion barrier portion 62 in Embodiment 1, the molded surface fastener 3 can be bent in top and bottom direction by widening or narrowing a gap provided between the vertical wall bodies 67 of the first and second barrier portions 66a, 66b.

The main lateral wall portion 63 in Embodiment 3 is formed of, as shown in FIGS. 14 and 15, a plurality of divided lateral wall bodies 63a standing between the left and right vertical resin intrusion barrier portions 62 intermittently from the upper surface of the substrate portion 60 with a constant height dimension along the width direction and a plurality of engaging elements 61 disposed between divided lateral wall bodies 63a. Particularly, in Embodiment 3, it is formed of six divided lateral wall bodies 64a in a row along the width direction and five engaging elements 61 standing between these divided lateral wall bodies 64a. Further, a fixing portion 60c fixing the linear magnetic material 60b is formed integrally in the main lateral wall portion 63.

In this case, the divided lateral wall bodies 63a of each main lateral wall portion 63 disposed adjacent to each other and the engaging elements 61 are connected at the lower end parts of the substrate portion 60 side each other. Owing to this, the divided lateral wall bodies 63a and the engaging element 61 are reinforced each other and their strength is enhanced. On the other hand, the upper end part of the divided lateral wall bodies 63a disposed adjacent to each other and the upper end parts of the engaging elements 61 are formed apart from each other so as a small interval to be formed between them.

Owing to this, since freedom is given to the movement of the engaging head portion of the engaging element 61, for example in molding the molded surface fastener 3 using the die wheel 31, the engaging element 61 can be easily pulled out from the cavity space of the die wheel 31 and the engaging element 61 having a predetermined shape can be stably molded.

It should be noted that, though the divided lateral wall bodies 63a and the engaging elements 61 are disposed apart with a small interval at the upper end part as described above, since the interval is small, the foam resin material 6 cannot intrude into the forming region of the engaging element 61 from the interval between the divided lateral wall body 63a and the engaging element 61 in foam molding of the cushion body 5.

Further, in the main lateral wall portion 63 in Embodiment 3, the height dimension from the upper surface of the substrate portion 60 in the divided lateral wall body 63a and the height dimension from the upper surface of the substrate portion 60 in the engaging element 61 are set to be the same size and also set to be the same size as the vertical wall body 67 of the first and second barrier portions 66a, 66b composing the left and right vertical resin intrusion barrier portions 62.

Figure 16:
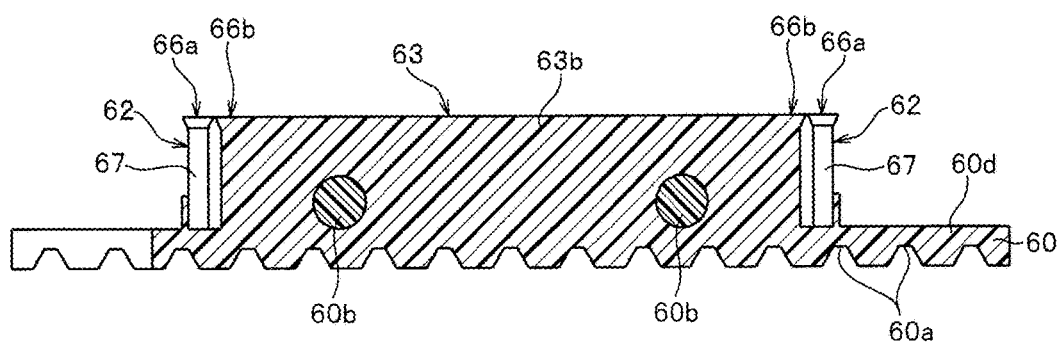
FIG. 16 is a cross-sectional view illustrating a modification embodiment of a main lateral wall portion.

It should be noted that, in Embodiment 3, for example shown in FIG. 16, it is possible that the main lateral wall portion 63 is provided at a different position in the length direction from the engaging element 61 so as to compart the engaging region 24 and the space region 25 as well as composed of a continuous lateral wall body 63b formed continuously along the width direction over the left and right vertical resin intrusion barrier portions 62. In this case, the continuous lateral wall body 63b is disposed linearly from the substrate portion 60 with a constant height dimension and connected to the second barrier portions 66b of the left and right vertical resin intrusion barrier portions 62.

An auxiliary lateral wall body 64 in Embodiment 3 is provided at a lateral line position of inside five lines of the engaging elements 61 except for the lateral lines of the engaging elements 61 disposed at front and rear end parts and forming the main lateral wall portion 63 out of seven lateral lines of the engaging elements 61 disposed within each engaging region 24 along the width direction. It should be noted that, in the present invention, a disposed position of the auxiliary lateral wall portion 64 is not limited in particular, and the auxiliary lateral wall portion 64 may be provided at an arbitral lateral line out of the above five lateral lines.

Each auxiliary lateral wall portion 64 in Embodiment 3 is formed of a plurality of divided lateral wall bodies 64a standing between the left and right vertical resin intrusion barrier portions 62 intermittently from the upper surface of the substrate portion 60 with a constant height dimension and a plurality of engaging elements 61 disposed between each divided lateral wall body 64a, similar to the main lateral wall portions 63.

Such an auxiliary lateral wall portions 64 as above are provided in the molded surface fastener 3 in Embodiment 3, thereby for example when the molded surface fastener 3 is cut at an engaging region 24 part along the width direction to form the molded surface fastener 3 in a desired length, the auxiliary lateral wall portion 64 disposed in the engaging region 24 can be used as an intrusion barrier portion which prevents the intrusion of the foam resin material 6 in foam molding of the cushion body 5.

Owing to this, it is prevented that the foam resin material 6 intrudes into the whole cut engaging region 24, and a part of engaging elements 61 in the engaging region 24 can be exposed outside stably without being buried into the cushion body 5. Therefore, an engaging area of the molded surface fastener 3 capable of engaging the skin material validly can be secured to be large, and the skin material can be fixed stably to the cushion body 5 to which the molded surface fastener 3 is integrated.

It should be noted that, in Embodiment 3, though the main lateral wall portion 63 and the auxiliary lateral wall portion 64 are formed to be the same shape, the lateral wall portion which prevents the foam resin material from flowing into the engaging region 24 when integrated to the surface of the cushion body 5 is regarded as the main lateral wall portion. In other words, the lateral wall portion which is disposed at the nearest position with respect to an intrusion-accepted space portion 65b described later becomes the main lateral wall portion 63.

Each space region 25 in Embodiment 3 is provided within a range from a position of the main lateral wall portion 63 of the engaging region 24 adjacent on the front side to the position of the main lateral wall portion 63 of the engaging region 24 adjacent on the rear side. The same length dimension of each space region 25 has an approximately same size as an attaching pitch in the length direction of the engaging elements 61 disposed in the engaging region 24.

A pair of left and right resistance adding wall portions 65 stand on the substrate portion 60 in each space region 25 along the length direction, and an upper surface of a part between the left and right resistance adding wall portions 65 is formed as a non-engaging region in which the engaging elements 61 do not exist. In this case, the left and right resistance adding wall portions 65 are disposed at a position inside of the left and right side edges of the substrate portion 60.

Further, each left and right resistance adding wall portion 65 disposed in each space region 25 is formed of two wall pieces 65a disposed on an extended line of the left and right vertical resin intrusion barrier portions 62. Moreover, an interval having a size with which the foam resin material 6 can pass easily in foam molding of the cushion body 5 is provided between these two wall pieces 65a. The interval becomes an intrusion-accepted space portion 65b which allows the foam resin material 6 to intrude into the space region 25 and flow in the width direction and has an enough gap through which the foam resin material 6 can flow in the width direction. In this case, each intrusion-accepted space portion 65b formed at the left and right resistance adding wall portions 65 in each space region 25 has an area from 0.15 mm² to 20 mm² from the side view.

In Embodiment 3, the wall piece 65a of the resistance adding wall portion 65 is connected directly to the vertical resin intrusion barrier portion 62 (particularly the connecting portion 68 of the vertical resin intrusion barrier portion 62). It should be noted that, in the present invention, the wall piece 65a of the resistance adding wall portion 65 may be provided at a position apart from the vertical resin intrusion barrier portion 62.

The molded surface fastener 3 in the above Embodiment 3 is manufactured by using the manufacturing apparatus 30 having the die wheel 31 in which a predetermined molding cavity is formed on the periphery shown in FIG. 5, as in the cases of the above Embodiments 1 and 2.

In this case, since a plurality of wall pieces 65a are provided in the space region 25 of the molded surface fastener 3 in Embodiment 3, in the manufacturing process of the molded surface fastener 3, when the long molded surface fastener 3 molded on the periphery of the die wheel 31 is peeled off continuously from the periphery of the die wheel 31 by the pickup roller 33, it can be suppressed that the peeling force for the molded surface fastener 3 becomes uneven in the length direction of the molded surface fastener 3 as in the above Embodiment 1. Owing to this, it is prevented that deformation or breakage of the engaging elements 61 disposed in the engaging region 24 of the molded surface fastener 3 or the main lateral wall portion 63 occurs, and the molded surface fastener 3 having a predetermined shape can be stably formed.

After that, in cutting process of the molded surface fastener 3, it is prevented that the upper and lower feed rollers 36a, 36b holding the molded surface fastener 3 run idle, and the molded surface fastener 3 can be conveyed stably toward the downstream side at a predetermined conveyance speed as in the case of the above Embodiment 1.

Then, the cushion body 5 is foam molded in a state that the molded surface fastener 3 in Embodiment 3 is fixed to the molding die 40 as in the case of the above Embodiments 1 and 2, thereby the molded surface fastener 3 is firmly fixed to a predetermined position in a state of burying the space region 25, and the cushion body 5 in which the engaging elements 61 in the engaging region 24 is exposed outside can be stably manufactured.

Further, since the engaging elements 61 are formed at the main lateral wall portion 63 of the molded surface fastener 3 in Embodiment 3, a part of the engaging element 61 is extended in the space region 25. However, since the part of the engaging element 61 extended in the space region 25 is buried into the foam resin when integrated to the surface of the cushion body 5, it does not function as an element which engages with a loop material attached to the skin material.

Embodiment 4

Figure 17:
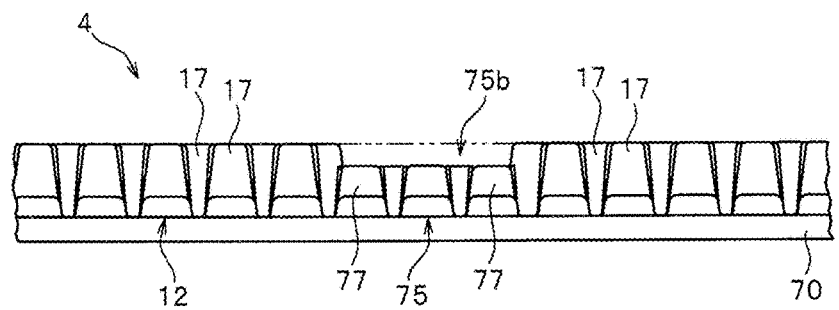
FIG. 17 is a side view illustrating a molded surface fastener according to Embodiment 4 of the present invention.
Figure 18:
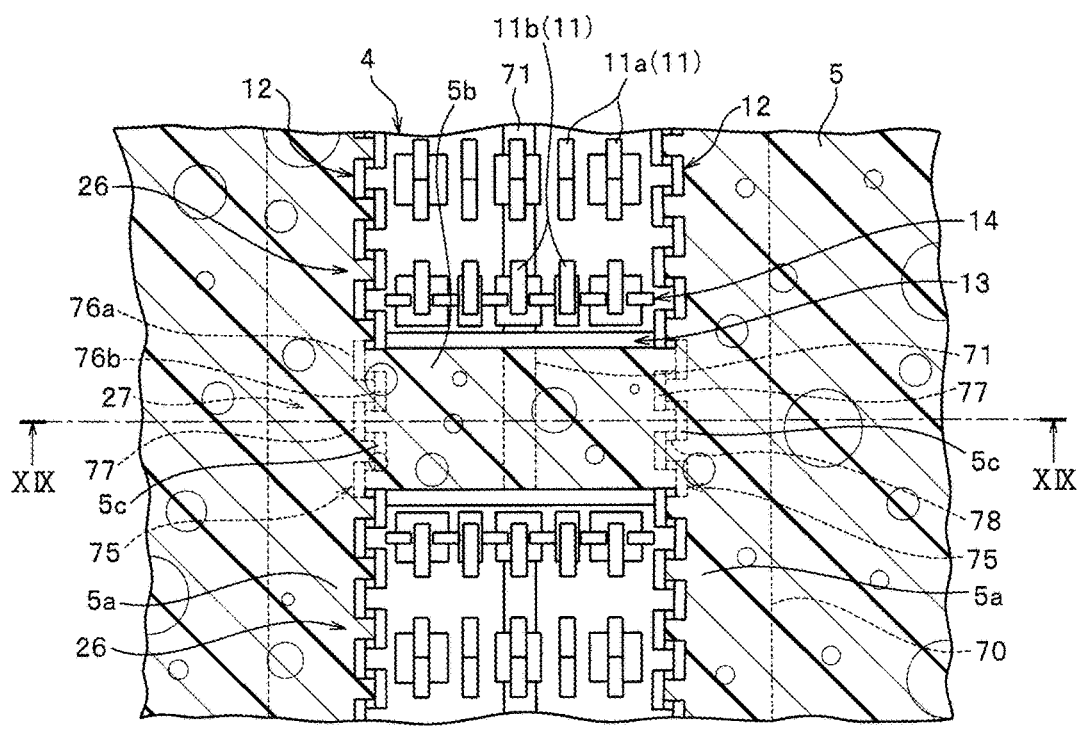
FIG. 18 is a main part enlarged view illustrating a surface of the cushion body to which the molded surface fastener is integrated.
Figure 19:
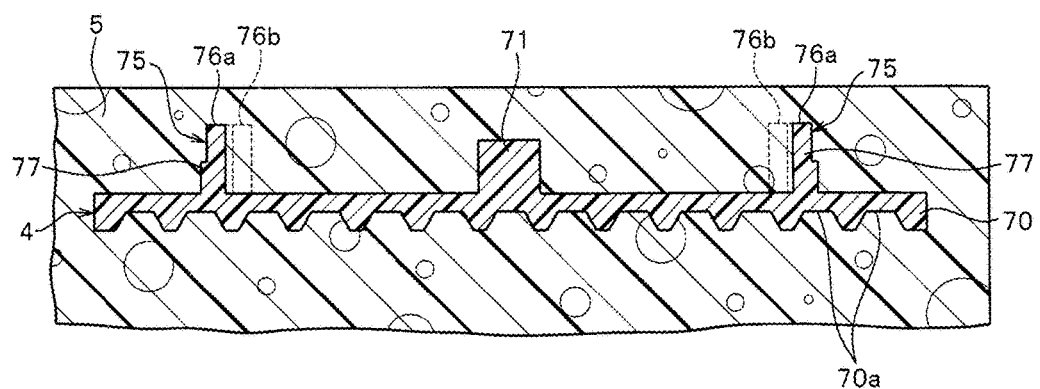
FIG. 19 is a cross-sectional view in XIX-XIX line shown in FIG. 18.
Figure 20:
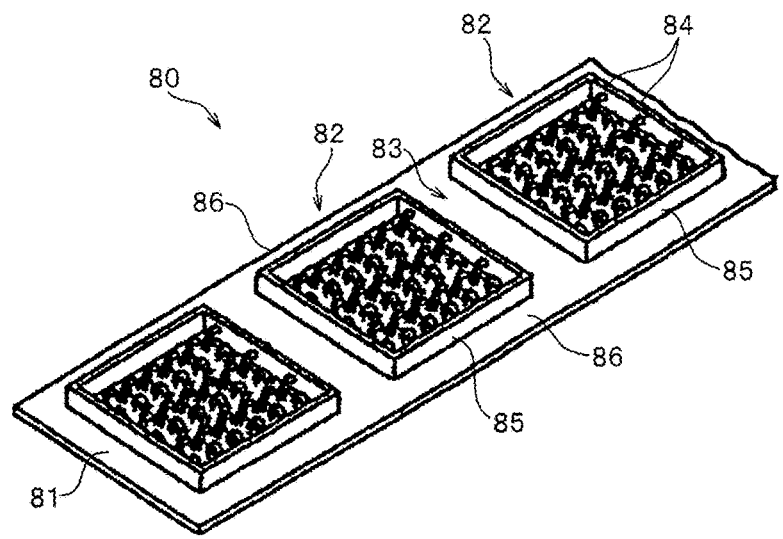
FIG. 20 is a perspective view illustrating a conventional molded surface fastener.
Figure 21:
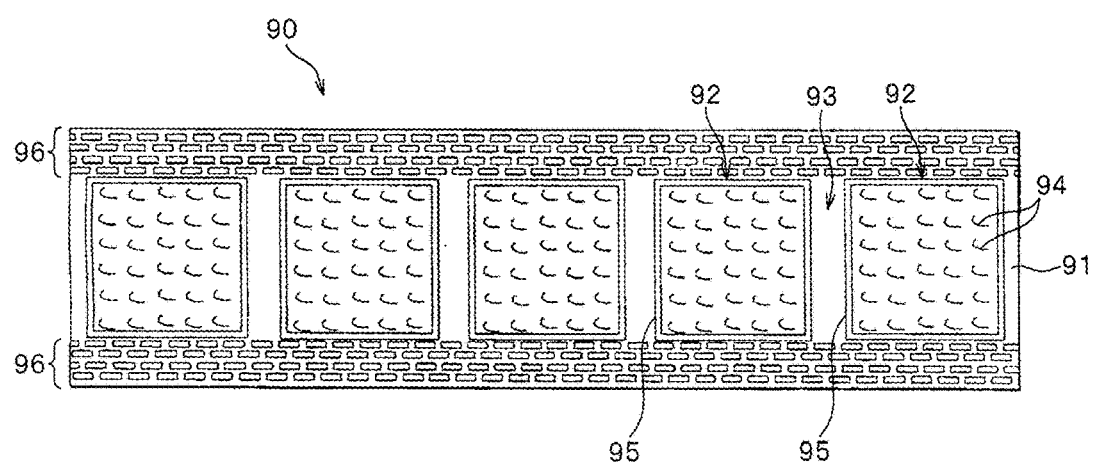
FIG. 21 is a plan view illustrating another conventional molded surface fastener.

FIG. 17 is a side view illustrating a molded surface fastener according to Embodiment 4 of the present invention. FIG. 18 is a main part enlarged view illustrating a surface of the cushion body 5 to which the molded surface fastener is integrated. FIG. 19 is a cross-sectional view in XIX-XIX line shown in FIG. 18.

The molded surface fastener 4 in Embodiment 4 has a thin plate-shaped substrate portion 70, and a plurality of concave groove portions 70a (or convex-shaped raised portion) parallel to front and rear direction are provided on a lower surface side of the substrate portion 70, as shown in FIG. 19. Further, an engaging region 26 in which a plurality of hook-shaped engaging elements 11 stand on the upper surface and a space region 27 having a flat surface in which the engaging elements 11 do not exist are disposed on the substrate portion 70 in Embodiment 4 alternately in a length direction. Each engaging region 26 is formed at a predetermined interval in the length direction.

In Embodiment 4, each engaging region 26 of the molded surface fastener 4 has a pair of left and right vertical resin intrusion barrier portions 12 standing on the left and right side edge parts of the substrate portion 70 along the length direction so as to interpose a plurality of engaging elements 11, front and rear main lateral wall portions 13 standing on a front end edge part and a rear edge part of each engaging region 26 along the width direction so as to compart from the space region 27, a subsidiary lateral wall portion 14 disposed adjacently to the inside of the front and rear main lateral wall portions 13, hook-shaped first engaging elements 11a disposed in a region surrounded by the left and right vertical resin intrusion barrier portions 12 and the front and rear main lateral wall portions 13, hook-shaped second engaging elements 11b composing the subsidiary lateral wall portion 14 together with a divided lateral wall body 14 and a convex rib portion 71 protruding integrally from the substrate portion 70 at a center part of the substrate portion 70 in the width direction along the length direction.

It should be noted that, the left and right vertical resin intrusion barrier portions 12, the front and rear main lateral wall portions 13, the subsidiary lateral wall portion 14, the first engaging elements 11a and the second engaging elements 11b in Embodiment 4 are formed to be the same as the left and right vertical resin intrusion barrier portions 12, the front and rear main lateral wall portions 13, the subsidiary lateral wall portion 14, the first engaging elements 11a and the second engaging elements 11b in the above Embodiment 1. Accordingly, in Embodiment 4, the explanation of these portions or parts is omitted.

The convex rib portion 71 in the engaging region 26 appears as a rectangular shape in a cross-section perpendicular to the length direction and is protruded on the upper surface of the substrate portion 70 with a continuous shape along the length direction. It should be noted that, in the present invention, the molded surface fastener 4 can be formed by excluding the convex rib portion 71 from the engaging region 26.

A pair of left and right resistance adding wall portions 75 standing at the left and right side edge parts of the substrate portion 70 along the length direction and a convex rib portion 71 protruding integrally from the substrate portion 70 along the length direction at a center part of the substrate portion 70 in the width direction in each space region 27 of the molded surface fastener 4 in Embodiment 4.

The left and right resistance adding wall portions 75 disposed in the space region 27 have a first barrier portion (outer vertical wall row) 76a disposed on an outer side in the width direction and a second barrier portion (inner vertical wall row) 76b disposed on an inner side (center part side of the width direction) of the first barrier portion 76a respectively. The first and second barrier portions 76a, 76b are composed of a plurality of wall pieces (vertical wall bodies) 77 disposed by lining in a row intermittently along the length direction respectively.

Further, the wall piece 77 composing the first and second barrier portions 76a, 76b is disposed intermittently at a predetermined attaching pitch along the front and rear direction respectively, and a predetermined gap is provided between respective wall pieces 77 adjacent in the length direction. The wall piece 77 of the outer first barrier portion 76a and the wall piece 77 of the inner second barrier portion 76b are disposed alternately by moving their positions in the length direction each other so as to be in a staggered position. Moreover, the front end part of the wall piece 77 of the first barrier portion 76a and a rear end part of the wall piece 77 of the second barrier portion 76b are connected each other by a wall connecting portion 78, and a rear end part of the wall piece 77 of the first barrier portion 76a and a front end part of the wall piece 77 of the second barrier portion 76b are connected each other by a wall connecting portion 78.

In Embodiment 4, the vertical resin intrusion barrier portion 12 in the engaging region 26 and the resistance adding wall portion 75 in the space region 27 are formed as a series of continuous wall portions standing continuously over the whole substrate portion 70 along the length direction.

Further, a height dimension from the substrate portion 70 at the resistance adding wall portion 75 of the space region 27 is set to be smaller than the one from the substrate portion 70 at the vertical resin intrusion barrier portion 12 of the engaging region 26. Owing to this, a space portion is formed from the upper end position (top end position) of the resistance adding wall portion 75 to the upper end position (top end position) of the vertical resin intrusion barrier portion 12 on the upper side of the resistance adding wall portion 75 of the space region 27 as shown in FIG. 17. The space portion in this region becomes an intrusion-accepted space portion 75b which allows the foam resin material 6 to intrude beyond the resistance adding wall portion 75 and flow in the space region 27 in the width direction easily.

In this case, an area from the side view of intrusion-accepted space portion 75b formed at the left and right resistance adding wall portions 75 in each space region 27 respectively (an area from the upper end position of the resistance adding wall portion 75 to the upper end position of the vertical resin intrusion barrier portion 12) is set to be from 0.15 mm$^2$ to 20 mm$^2$.

In the molded surface fastener 4 in Embodiment 4, a convex rib portion 71 appearing as a rectangular shape in the cross section perpendicular to the length direction is disposed in the space region 27 as a shape which is continuous to the convex rib portion 71 of the engaging region 26 along the length direction.

The molded surface fastener 4 in the above Embodiment 4 is manufactured by using a manufacturing apparatus 30 having a die wheel 31 in which a predetermined molding cavity is formed on the periphery as shown in FIG. 5, as in the case of the above Embodiments 1-3.

In this case, in the molded surface fastener 4 in Embodiment 4, since the left and right resistance adding wall portions 75 and the convex rib portion 71 are provided in the space region 27, when the long molded surface fastener 4 formed at the periphery of the die wheel 31 is peeled off from the periphery of the die wheel 31 by a pickup roller 33 continuously in the manufacturing process of the molded surface fastener 4, the peeling resistance with which the space region 27 is peeled from the periphery of the die wheel 31 can be larger than for example in the case of the molded surface fastener 1 in the above Embodiment 1.

Owing to this, it can be effectively suppressed that the peeling force for the molded surface fastener 4 becomes uneven in the length direction of the molded surface fastener 4. Therefore it is prevented that deformation or breakage of the first and second engaging elements 11a, 11b disposed in the engaging region 26 of the molded surface fastener 4 and the main lateral wall portion 13 occurs, and the molded surface fastener 4 having a predetermined shape can be stably formed.

Further, though a height dimension of the resistance adding wall portion 75 in the space region 27 is smaller than the one of the vertical resin intrusion barrier portion 12 in the engaging region 26, since the resistance adding wall portion 75 is provided continuous to the vertical resin intrusion barrier portion 12 in the engaging region 26 as described above, it is prevented more effectively that the upper and lower feed rollers 36a, 36b holding the molded surface fastener 4 in the cutting process of the molded surface fastener 4 run idle and the molded surface fastener 4 can be conveyed toward the downstream side at a predetermined speed more stable than for example in a case that the resistance adding wall portion 75 is not provided in the space region 27.

Then, the cushion body 5 is foam molded in a state that the molded surface fastener 4 in Embodiment 4 is fixed at the molding die 40, thereby it can be prevented that the foam resin material 6 intrudes into a forming region of the first and second engaging elements 11a, 11b beyond the left and right vertical resin intrusion barrier portions 12 and the front and rear main lateral wall portions 13, as in the case of the above Embodiments 1-3. Therefore, for example shown in FIG. 18, a predetermined engagement force obtained by the first and second engaging elements 11a, 11b can be stably secured by exposing the first and second engaging elements 11a, 11b to an outer surface of the cushion body 5.

On the other hand, since the foam resin material 6 flows in the space region 27 in the width direction via the intrusion-accepted space portion 75b formed on the upper side of the resistance adding wall portion 75 in foam molding of the cushion body 5, the molded surface fastener 4 is fixed at a predetermined position in a state of burying the substrate portion 70, the left and right resistance adding wall portions 75 and the convex rib portion 71 in the space region 27 into the cushion body 5, and an outer cushion part 5a to which the outer side surfaces of the left and right vertical resin intrusion barrier portions 12 are fixed and an inner cushion part 5b to which the upper surfaces inside of the left and right resistance adding wall portions 75 on the substrate portion 70 in the space region 27 are fixed are formed continuously and integrally via a cushion part 5c passing through the intrusion-accepted space portion 75b as shown in FIGS. 18 and 19. Owing to this, since the fixing strength of the molded surface fastener 4 with respect to the cushion body 5 can be effectively enhanced, the cushion body 5 to which the molded surface fastener 4 is firmly integrated can be stably manufactured.

It should be noted that, though the convex rib portion 71 protruding from the substrate portion 70 is provided in the space region 27 in the molded surface fastener 4 in Embodiment 4 as described above, such a convex rib portion 71 as in Embodiment 4 is not provided in each space region 22, 23, 25 of the molded surface fasteners 1, 1a, 2, 3 in the above Embodiments 1-3.

However, in the present invention, such a convex rib portion 71 as in Embodiment 4 can be provided for example in each space region 22, 23, 25 of the molded surface fasteners 1, 1a, 2, 3 in the Embodiments 1-3. Owing to this, in the above Embodiments 1-3, when the long molded surface fasteners 1, 1a, 2, 3 formed on the periphery of the die wheel 31 are peeled off from the periphery of the die wheel 31 by the pickup roller 33 continuously, it becomes possible that the peeling force of the molded surface fasteners 1, 1a, 2, 3 becomes more uniformly in the length direction by making the peeling resistance of the space regions 22, 23, 25 larger.

REFERENCE SIGNS LIST 1, 1a, 2 Molded surface fastener
3, 4 Molded surface fastener
5 Cushion body
5a, 5b, 5c Cushion part
6 Foam resin material
10 Substrate portion
11 Engaging element
11a First engaging element
11b Second engaging element
12 Vertical resin intrusion barrier portion
13 Main lateral wall portion
13a Continuous lateral wall body
14 Subsidiary lateral wall portion
14a Divided lateral wall body (subsidiary lateral wall body)
15 Resistance adding wall portion
15a Wall piece
15b Interval (Intrusion-accepted space portion)
16a First barrier portion (outer vertical wall row)
16b Second barrier portion (inner vertical wall row)
17 Vertical wall body
18 Wall connecting portion
19 Resistance adding wall portion
19a Wall piece
19b Interval (Intrusion-accepted space portion)
21 Engaging region
22, 23 Space region
24 Engaging region
25 Space region
26 Engaging region
27 Space region
30 Manufacturing apparatus (Molding apparatus)
31 Die wheel
32 Continuous extrusion nozzle
33 Pickup roller
35 Cutting apparatus
36a, 37b Feed roller
37 Cutter portion
40 Molding die
41 Lower mold (Fixing mold)
42 Cavity surface
42a Top portion
42b Sloped portion
42c Bottom surface portion
42d Side wall surface portion
43 Surface fastener attaching portion
44 Injection nozzle
55 Resistance adding wall portion
55a Wall piece
60 Substrate portion
60a concave groove portion
60b Linear magnetic material
60c Fixing portion
60d Fin piece portion
61 Engaging element
62 Vertical resin intrusion barrier portion
63 Main lateral wall portion
63a Divided lateral wall body
63b Continuous lateral wall body
64 Auxiliary lateral wall portion
64a Divided lateral wall body
65 Resistance adding wall portion
65a Wall piece
65b Intrusion-accepted space portion
66a First barrier portion (outer vertical wall row)
66b Second barrier portion (inner vertical wall row)
67 Vertical wall body
68 Connecting portion
70 Substrate portion
70a Concave groove portion
71 Convex rib portion
75 Resistance adding wall portion (Vertical wall portion)
75b Intrusion-accepted space portion
76a First barrier portion (outer vertical wall row)
76b Second barrier portion (inner vertical wall row)
77 Wall piece (Vertical wall body)
78 Wall connecting portion

The invention claimed is:

1. A molded surface fastener, which is configured to be integrated to a cushion body during a foam molding process of the cushion body wherein the molded surface fastener is made of synthetic resin and has a plurality of engaging regions in which a plurality of hook-shaped engaging elements stand on a plate-shaped substrate portion and a plurality of space regions which are disposed between the engaging regions, each of the engaging regions having a pair of left and right vertical resin intrusion barrier portions standing at left and right side edge parts of the substrate portion along a length direction and having a constant height dimension continuously and main lateral wall portions standing at a front end edge part and a rear end edge part of the engaging region along a width direction and separating the engaging region from the space regions, wherein each of the space regions has a pair of left and right resistance adding wall portions standing at left and right side edge parts of the substrate portion along the length direction, each of the left and right resistance adding wall portions has a plurality of wall pieces standing on the substrate portion and intrusion-accepted space portions which allow a foam resin material of the cushion body to intrude beyond the wall pieces and flow in the space region in the width direction during the foam molding process of the cushion body, each of the left and right resistance adding wall portions is provided from a respective one of the left and right vertical resin intrusion barrier portions along an extended line of the respective vertical resin intrusion barrier portion, and a total area of the intrusion-accepted space portions formed in each of the space regions is within a range of 0.15 mm² to 20 mm², wherein the area is defined in a vertical plane in the length direction.

2. The molded surface fastener according to claim 1, wherein the plurality of wall pieces stand separately in the respective space regions as a resistance adding portion configured for adding resistance when the space regions of the molded surface fastener are peeled off from a molding die after molding the molded surface fastener.

3. The molded surface fastener according to claim 1, wherein the intrusion-accepted space portions have at least one space portion provided between the wall pieces or have a space portion provided between one of the wall pieces and the left or right vertical resin intrusion barrier portion or the main lateral wall portion.

4. The molded surface fastener according to claim 1, wherein a height dimension from the substrate portion at the wall pieces is set to be the same size as the height dimension from the substrate portion at the vertical resin intrusion barrier portions.

5. The molded surface fastener according to claim 1, wherein the wall pieces are disposed in a row along the extended line of the respective vertical resin intrusion barrier portion in the space region.

6. The molded surface fastener according to claim 1, wherein the left and right resistance adding wall portions are disposed continuously to the respective vertical resin intrusion barrier portions, a height dimension from the substrate portion at the left and right resistance adding wall portions is set to be smaller than the height dimension from the substrate portion at the vertical resin intrusion barrier portions, and the intrusion-accepted space portions are provided at an upper side of the left and right resistance adding wall portions and formed of the space portion within a range from a top end position of the left or right resistance adding wall portion to a top end position of the respective vertical resin intrusion barrier portion.

7. The molded surface fastener according to claim 1, wherein the engaging region has subsidiary lateral wall portions adjacent to an inside of the main lateral wall portions disposed along a width direction.

8. The molded surface fastener according to claim 1, wherein the engaging region has at least one auxiliary lateral wall portion disposed between the front and rear main lateral wall portions disposed at a front end edge part and a rear end edge part in the engaging region along the width direction.

9. A cushion body in which a molded surface fastener according to claim 1 is integrated to a surface of the cushion body, wherein a bottom surface of the molded surface fastener, outer side surfaces of the left and right vertical resin intrusion barrier portions and a surface of the space region are fixed to the cushion body and the cushion body has outer side cushion parts to which the outer side surfaces of the left and right vertical resin intrusion barrier portions are fixed, an inner side cushion part to which the surface of the space region is fixed, and continuous cushion parts which intrude into the intrusion-accepted space portions and are configured to integrally connect the outer side cushion parts and the inner side cushion part.

* * * * *